US008860833B2

(12) United States Patent
Georgiev et al.

(10) Patent No.: US 8,860,833 B2
(45) Date of Patent: Oct. 14, 2014

(54) BLENDED RENDERING OF FOCUSED PLENOPTIC CAMERA DATA

(75) Inventors: Todor G. Georgiev, Sunnyvale, CA (US); Andrew Lumsdaine, Bloomington, IN (US)

(73) Assignee: Adobe Systems Incorporated, San Jose, CA (US)

( * ) Notice: Subject to any disclaimer, the term of this patent is extended or adjusted under 35 U.S.C. 154(b) by 879 days.

(21) Appl. No.: 12/957,326

(22) Filed: Nov. 30, 2010

(65) Prior Publication Data

US 2013/0120605 A1    May 16, 2013

Related U.S. Application Data

(60) Provisional application No. 61/310,203, filed on Mar. 3, 2010.

(51) Int. Cl.
*H04N 5/235* (2006.01)
*H04N 5/228* (2006.01)
*G06T 15/20* (2011.01)

(52) U.S. Cl.
CPC ............ *G06T 15/205* (2013.01); *G06T 2200/21* (2013.01)
USPC .................................... 348/222.1; 348/208.1

(58) Field of Classification Search
CPC ................................................ G02B 27/2214
USPC .......................... 348/218.1, 222.1; 250/208.1
See application file for complete search history.

(56) References Cited

U.S. PATENT DOCUMENTS

| 725,567 | A | 4/1903 | Ives |
|---|---|---|---|
| 2,039,648 | A | 5/1936 | Ives |
| 3,743,379 | A | 7/1973 | McMahon |
| 3,971,065 | A | 7/1976 | Bayer |
| 3,985,419 | A | 10/1976 | Matsumoto et al. |
| 4,175,844 | A | 11/1979 | Glaser-Inbari |
| 4,180,313 | A | 12/1979 | Inuiya |

(Continued)

FOREIGN PATENT DOCUMENTS

| CN | 101588437 | 11/2009 |
|---|---|---|
| CN | 101610353 | 12/2009 |

(Continued)

OTHER PUBLICATIONS

Adelson, T., et al. "Single Lens Stereo with a Plenoptic Camera," IEEE Transactions on Pattern Analysis and Machine, Intelligence 14, 2, Feb. 1992, pp. 99-106.

(Continued)

*Primary Examiner* — Joel Fosselman
(74) *Attorney, Agent, or Firm* — Wolfe-SBMC

(57) ABSTRACT

Methods, apparatus, and computer-readable storage media for rendering focused plenoptic camera data. A rendering with blending technique is described that blends values from positions in multiple microimages and assigns the blended value to a given point in the output image. A rendering technique that combines depth-based rendering and rendering with blending is also described. Depth-based rendering estimates depth at each microimage and then applies that depth to determine a position in the input flat from which to read a value to be assigned to a given point in the output image. The techniques may be implemented according to parallel processing technology that renders multiple points of the output image in parallel. In at least some embodiments, the parallel processing technology is graphical processing unit (GPU) technology.

20 Claims, 20 Drawing Sheets

(56) References Cited

U.S. PATENT DOCUMENTS

| | | |
|---|---|---|
| 4,193,093 A | 3/1980 | St. Clair |
| 4,230,942 A | 10/1980 | Stauffer |
| 4,580,219 A | 4/1986 | Pelc et al. |
| 4,732,453 A | 3/1988 | de Montebello et al. |
| 4,849,782 A | 7/1989 | Koyama et al. |
| 5,076,687 A | 12/1991 | Adelson |
| 5,125,750 A | 6/1992 | Corle et al. |
| 5,361,127 A | 11/1994 | Daily |
| 5,400,093 A | 3/1995 | Timmers |
| 5,579,445 A | 11/1996 | Loce et al. |
| 5,659,420 A | 8/1997 | Wakai et al. |
| 5,724,122 A | 3/1998 | Oskotsky |
| 5,729,011 A | 3/1998 | Sekiguchi |
| 5,946,077 A | 8/1999 | Nemirovskiy |
| 5,987,164 A | 11/1999 | Szeliski et al. |
| 6,009,188 A | 12/1999 | Cohen et al. |
| 6,097,394 A | 8/2000 | Levoy et al. |
| 6,097,541 A | 8/2000 | Davies et al. |
| 6,137,535 A | 10/2000 | Meyers |
| 6,137,937 A | 10/2000 | Okano et al. |
| 6,268,846 B1 | 7/2001 | Georgiev |
| 6,301,416 B1 | 10/2001 | Okano et al. |
| 6,317,192 B1 | 11/2001 | Silverbrook et al. |
| 6,339,506 B1 | 1/2002 | Wakelin et al. |
| 6,341,183 B1 | 1/2002 | Goldberg |
| 6,351,269 B1 | 2/2002 | Georgiev |
| 6,476,805 B1 | 11/2002 | Shum et al. |
| 6,570,613 B1 | 5/2003 | Howell |
| 6,738,533 B1 | 5/2004 | Shum et al. |
| 6,804,062 B2 | 10/2004 | Atwater et al. |
| 6,831,782 B2 | 12/2004 | Patton et al. |
| 6,838,650 B1 | 1/2005 | Toh |
| 6,842,297 B2 | 1/2005 | Dowski, Jr. |
| 6,961,075 B2 | 11/2005 | Mindler et al. |
| 7,019,671 B2 | 3/2006 | Kawai |
| 7,054,067 B2 | 5/2006 | Okano et al. |
| 7,085,062 B2 | 8/2006 | Hauschild |
| 7,113,231 B2 | 9/2006 | Conner et al. |
| 7,119,319 B2 | 10/2006 | Noto et al. |
| 7,164,446 B2 | 1/2007 | Konishi |
| 7,167,203 B1 | 1/2007 | Yukawa et al. |
| 7,367,537 B2 | 5/2008 | Ibe |
| 7,470,032 B2 | 12/2008 | Damera-Venkata et al. |
| 7,620,309 B2 | 11/2009 | Georgiev |
| 7,723,662 B2 | 5/2010 | Levoy et al. |
| 7,732,744 B2 | 6/2010 | Utagawa |
| 7,792,423 B2 | 9/2010 | Raskar et al. |
| 7,838,814 B2 | 11/2010 | Minhas et al. |
| 7,872,796 B2 | 1/2011 | Georgiev |
| 7,880,794 B2 | 2/2011 | Yamagata et al. |
| 7,916,934 B2 | 3/2011 | Vetro et al. |
| 7,936,392 B2 | 5/2011 | Ng et al. |
| 7,949,252 B1 | 5/2011 | Georgiev |
| 7,956,924 B2 | 6/2011 | Georgiev |
| 7,962,033 B2 | 6/2011 | Georgiev et al. |
| 7,965,936 B2 | 6/2011 | Raskar et al. |
| 7,978,234 B2 | 7/2011 | Yano et al. |
| 8,019,215 B2 | 9/2011 | Georgiev et al. |
| 8,106,994 B2 | 1/2012 | Ichimura |
| 8,126,323 B2 | 2/2012 | Georgiev et al. |
| 8,155,456 B2 | 4/2012 | Babacan et al. |
| 8,160,439 B2 | 4/2012 | Georgiev et al. |
| 8,189,065 B2 | 5/2012 | Georgiev et al. |
| 8,189,089 B1 | 5/2012 | Georgiev |
| 8,228,417 B1 | 7/2012 | Georgiev et al. |
| 8,237,843 B2 | 8/2012 | Yamamoto et al. |
| 8,243,157 B2 | 8/2012 | Ng et al. |
| 8,289,440 B2 | 10/2012 | Knight et al. |
| 8,290,358 B1 | 10/2012 | Georgiev |
| 8,315,476 B1 | 11/2012 | Georgiev et al. |
| 8,330,848 B2 | 12/2012 | Yamamoto |
| 8,345,144 B1 | 1/2013 | Georgiev et al. |
| 8,379,105 B2 | 2/2013 | Georgiev et al. |
| 8,380,060 B2 | 2/2013 | Georgiev et al. |
| 8,390,728 B2 | 3/2013 | Lim et al. |
| 8,400,555 B1 | 3/2013 | Georgiev et al. |
| 8,401,316 B2 | 3/2013 | Babacan et al. |
| 8,471,920 B2 | 6/2013 | Georgiev et al. |
| 8,502,911 B2 | 8/2013 | Yamamoto et al. |
| 8,559,756 B2 | 10/2013 | Georgiev et al. |
| 8,570,426 B2 | 10/2013 | Pitts et al. |
| 8,611,693 B2 | 12/2013 | Intwala et al. |
| 8,665,341 B2 | 3/2014 | Georgiev et al. |
| 8,724,000 B2 | 5/2014 | Georgiev et al. |
| 8,803,918 B2 | 8/2014 | Georgiev et al. |
| 8,817,015 B2 | 8/2014 | Georgiev et al. |
| 2001/0012149 A1 | 8/2001 | Lin et al. |
| 2001/0050813 A1 | 12/2001 | Allio |
| 2002/0140835 A1 | 10/2002 | Silverstein |
| 2002/0159030 A1 | 10/2002 | Frey et al. |
| 2003/0108821 A1 | 6/2003 | Mei et al. |
| 2003/0117511 A1 | 6/2003 | Belz et al. |
| 2003/0156077 A1 | 8/2003 | Balogh |
| 2003/0231255 A1 | 12/2003 | Szajewski et al. |
| 2004/0114807 A1 | 6/2004 | Lelescu et al. |
| 2004/0218830 A1 | 11/2004 | Kang et al. |
| 2004/0223214 A1 | 11/2004 | Atkinson |
| 2005/0080602 A1 | 4/2005 | Snyder et al. |
| 2005/0088714 A1 | 4/2005 | Kremen |
| 2005/0099504 A1 | 5/2005 | Nayar et al. |
| 2005/0122418 A1 | 6/2005 | Okita et al. |
| 2005/0243178 A1 | 11/2005 | McConica |
| 2006/0061845 A1 | 3/2006 | Lin |
| 2006/0072029 A1 | 4/2006 | Miyatake et al. |
| 2006/0104542 A1 | 5/2006 | Blake et al. |
| 2006/0109282 A1 | 5/2006 | Lin et al. |
| 2006/0171032 A1 | 8/2006 | Nishioka |
| 2006/0177150 A1 | 8/2006 | Uyttendaele et al. |
| 2007/0091197 A1 | 4/2007 | Okayama et al. |
| 2007/0183057 A1 | 8/2007 | Terada et al. |
| 2007/0252074 A1* | 11/2007 | Ng et al. .................. 250/208.1 |
| 2007/0258096 A1 | 11/2007 | Cui et al. |
| 2007/0285526 A1 | 12/2007 | Mann et al. |
| 2008/0007839 A1 | 1/2008 | Deng et al. |
| 2008/0056549 A1 | 3/2008 | Hamill et al. |
| 2008/0095469 A1 | 4/2008 | Kiser |
| 2008/0107231 A1 | 5/2008 | Miyazaki et al. |
| 2008/0142685 A1 | 6/2008 | Gazeley |
| 2008/0152215 A1 | 6/2008 | Horie et al. |
| 2008/0165270 A1 | 7/2008 | Watanabe et al. |
| 2008/0166063 A1 | 7/2008 | Zeng |
| 2008/0187305 A1 | 8/2008 | Raskar et al. |
| 2008/0193026 A1 | 8/2008 | Horie et al. |
| 2008/0218610 A1 | 9/2008 | Chapman et al. |
| 2008/0247623 A1 | 10/2008 | Delso et al. |
| 2008/0266655 A1 | 10/2008 | Levoy et al. |
| 2009/0002504 A1 | 1/2009 | Yano et al. |
| 2009/0027542 A1 | 1/2009 | Yamamoto et al. |
| 2009/0041381 A1 | 2/2009 | Georgiev |
| 2009/0041448 A1 | 2/2009 | Georgiev |
| 2009/0086304 A1 | 4/2009 | Yurlov et al. |
| 2009/0122175 A1 | 5/2009 | Yamagata |
| 2009/0127440 A1 | 5/2009 | Nakai |
| 2009/0128658 A1 | 5/2009 | Hayasaka et al. |
| 2009/0128669 A1 | 5/2009 | Ng et al. |
| 2009/0140131 A1 | 6/2009 | Utagawa |
| 2009/0167922 A1 | 7/2009 | Perlman et al. |
| 2009/0179142 A1 | 7/2009 | Duparre et al. |
| 2009/0185801 A1 | 7/2009 | Georgiev et al. |
| 2009/0190022 A1 | 7/2009 | Ichimura |
| 2009/0268970 A1 | 10/2009 | Babacan et al. |
| 2009/0295829 A1 | 12/2009 | Georgiev et al. |
| 2009/0316014 A1 | 12/2009 | Lim et al. |
| 2010/0013979 A1 | 1/2010 | Golub et al. |
| 2010/0026852 A1 | 2/2010 | Ng et al. |
| 2010/0085468 A1 | 4/2010 | Park et al. |
| 2010/0091133 A1 | 4/2010 | Lim et al. |
| 2010/0097491 A1 | 4/2010 | Farina et al. |
| 2010/0128145 A1 | 5/2010 | Pitts et al. |
| 2010/0141802 A1 | 6/2010 | Knight et al. |
| 2010/0205388 A1 | 8/2010 | MacInnis |
| 2010/0265381 A1 | 10/2010 | Yamamoto et al. |
| 2010/0265386 A1 | 10/2010 | Raskar et al. |
| 2011/0043604 A1 | 2/2011 | Peleg et al. |

(56) References Cited

U.S. PATENT DOCUMENTS

| | | |
|---|---|---|
| 2011/0063354 A1 | 3/2011 | Enge |
| 2011/0069189 A1* | 3/2011 | Venkataraman et al. ... 348/218.1 |
| 2011/0141224 A1 | 6/2011 | Stec et al. |
| 2011/0157387 A1 | 6/2011 | Han et al. |
| 2011/0169980 A1 | 7/2011 | Cho et al. |
| 2011/0211824 A1 | 9/2011 | Georgiev et al. |
| 2012/0183232 A1 | 7/2012 | Babacan et al. |
| 2012/0229679 A1 | 9/2012 | Georgiev et al. |
| 2012/0281072 A1 | 11/2012 | Georgiev et al. |
| 2013/0120356 A1 | 5/2013 | Georgiev et al. |
| 2013/0121615 A1 | 5/2013 | Intwala et al. |
| 2013/0127901 A1 | 5/2013 | Georgiev et al. |
| 2013/0128030 A1 | 5/2013 | Georgiev |
| 2013/0128068 A1 | 5/2013 | Georgiev et al. |
| 2013/0128069 A1 | 5/2013 | Georgiev et al. |
| 2013/0128077 A1 | 5/2013 | Georgiev |
| 2013/0128081 A1 | 5/2013 | Georgiev et al. |
| 2013/0128087 A1 | 5/2013 | Georgiev et al. |
| 2013/0342734 A1 | 12/2013 | Georgis et al. |

FOREIGN PATENT DOCUMENTS

| | | |
|---|---|---|
| CN | 807604 | 7/2011 |
| EP | 1548481 | 6/2005 |
| JP | 504669 | 10/1976 |
| JP | 7270791 | 10/1995 |
| JP | 2001330769 | 11/2001 |
| JP | 2004239932 | 8/2004 |
| WO | 01/37025 | 5/2001 |
| WO | WO-0137025 | 5/2001 |
| WO | 2006/057838 | 6/2006 |
| WO | WO-2006057838 | 6/2006 |
| WO | WO-2007044725 | 4/2007 |
| WO | 2007/115281 | 10/2007 |
| WO | WO-2007115281 | 10/2007 |
| WO | WO-2009151903 | 12/2009 |

OTHER PUBLICATIONS

Ng, R., et al, "Light Field Photography with a Hand-Held Plenoptic Camera," Stanford Univ. Computer Science Tech, Report CSTR 2005-02, Apr. 2005, 11 pages.

Ng R.: "Fourier Slice Photography," Proceedings of ACM SIGGRAPH 2005 (Jan. 2005), 10 pages.

Lin Z., Shum H.: Fundamental limits of reconstruction-based super-resolution algorithms under local translation. IEEE Transactions on Pattern Analysis and Machine Intelligence 26, 1 (Jan. 2004), 83-97.

Levoy, Mark et al., "Light Field Microscopy," Stanford University, Submitted to Siggraph 2006, 5 pages.

Levoy, Mark, "Optical Recipes for Light Microscopes," Stanford Computer Grpahics Laboratory Technical Memo 2006-001, Jun. 20, 2006, 10 pages.

Levoy M., Hanrahan P.: "Light Field Rendering," ACM Trans. Graph. (1996), 31-42.

M. Levoy, "Light Fields and computational Imaging," Computer [Online], vol. 39, No. 8, Aug. 2006, pp. 46-55, XP002501300.

Georgeiv, et al. "Spatio-Angular Resolution Tradeoff in Integral Photography," Proc. EGSR, 2006, 10 pages.

Georgiev T., Wainer M.: "Morphing Between Multiple Images," Tech. Rep. Apr. 17, 1997, 17 pages.

Georgiev T., Lumsdaine A.: Depth of field in plenoptic cameras. In Eurographics 2009—Annex (Apr. 2009), pp. 5-8.

Brown M., Lowe D. G.: "Unsupervised 3d Object Recognition and Reconstruction in Unordered Datasets," In Proceedings of 5th International Conference on 3D Imaging and Modelling (3DIM) (2005), pp. 21-30.

Gortler S. J., Grzeszczuk R., Szeliski, R., Cohen M. F.: "The Lumigraph," ACM Trans. Graph. (1996), 43-54.

Isaksen A., McMillan L., Gortler S. J.: "Dynamically Reparameterized Light Fields," ACM Trans. Graph. (2000), 297-306.

Lee S., Wolberg G., Shin S.: "Polymorph: Morphing Among Multiple Images," IEEE Computer Graphics and Applications (Jan./Feb. 1998), 14 pages.

Lippmann G.: "Epreuves reversible donnant la sensation du relief ("Reversible Prints Providing the Sensation of Depth")", Journal of Physics 7 (1908), pp. 821-825.

Lippmann G.: "Epreuves Reversibles Photographies Integrales," Academie des sciences (Mar. 1908), pp. 446-451.

Naemura T., Yoshida T., Harashima H.: "3d Computer Graphics Based on Integral Photography," Optics Express, vol. 8,2 (Feb. 6, 2001), 8 pages.

Seitz S. M., Dyer C. R.: "View Morphing," ACM Trans. Graph. (1996), 21-30.

Stevens R., Harvey T.: "Lens Arrays for a Three-dimensional Imaging System," Journal of Optics A, vol. 4 (2002), 5 pages.

Stewart J., Yu J., Gortler S. J., McMillan L.: "A New Reconstruction Filter for Undersampled Light Field" Eurographics Symposium on Rendering (2003), 150-156.

Vaish V., Wilburn B., Joshi N., Levoy M.: "Using Plane + Parallax to Calibrate Dense Camera Arrays," In Proceedings of IEEE Conference on Computer Vision and Pattern Recognition (CVPR) (2004), 8 pages.

Wilburn B., Joshi N., Vaish V., Talvala E., Antunez E., Barth A., Adams A., Levoy M., Horowitz M.: "High Performance Imaging Using Large Camera Arrays," In ACM Trans. Graph. (2005), 12 pages.

Xiao J., Shah M.: "Tri-view Morphing," Computer Vision and Image Understanding 96, 3 (2004), 345-366.

Zitnick C. L., Jojic N., Kang S.: "Consistent Segmentation for Optical Flow Estimation" In Proceedings of IEEE International Conference on Computer Vision (ICCV) (2005), 8 pages.

Veeraraghavan, et al., "Dappled Photography: Mask Enhanced Cameras for Heterodyned Light Fields and Coded Aperture Refocusing," ACM Transaction on Graphics, vol. 26, No. 3, Article 69, Jul. 2007, 12 pages, XP002491494.

J. Chai, S. Chan, H. Shum, and X. Tong: "Plenoptic Sampling", ACM Trans. Graph., pp. 307-318, 2000.

F. Durand, N. Holzschuch, C. Soler, E. Chan, and F. Sillion: "A frequency Analysis of Light Transport," ACM Trans. Graph., pp. 1115-1126, 2005.

Todor Georgiev and Chintan Intwala: "Light Field Camera Design for Integral View Photography," Adobe Tech. Rep., 2006, 13 pages.

J. Neumann, et al., "Eyes from Eyes Analysis of Camera Design Using Plenoptic Video Geometry," Dec. 2001, 20 pages, XP002509893.

Zaharia, R., et al., "Adaptive 3D-DCT Compression Algorithm for Continuous Parallax 3D Integral Imaging," Signal Processing, Image Communication, Elsevier Scient Publishers, Amsterdam, NL, vol. 17, No. 3, Mar. 1, 2002, 12 pages.

Yang, J C, et al., "A Real-Time Distributed Light Field Camera," Rendering Techniques 2002, Eurographics Workshop Proceedings, PIS, Italy, Jun. 26-28, 2002, 9 pages.

Zhang, et al., "A Survey on Image-based Rendering-Representation, Sampling and Compression," Signal Processing, Image Communication, Elsevier Science Publishers, vol. 19, No. 1, Jan. 1, 2004, 28 pages.

Heung-Yeung Shum, et al., "Survey of Image-Based Representations and Compression Techniques," IEEE Transactions on Circuits and Systems for Video Technology, IEEE Service Center, vol. 13, No. 11, Nov. 1, 2003, 18 pages.

Shing-Chow, Chan, et al., "The Compression of Simplified Dynamic Light Fields," Proceedings of International Conference on Acoustics, Speech and Signal Processing, Apr. 6-10, 2003 Hong Kong, vol. 3, Apr. 6, 2003, 4 pages.

Ulrich, Fecker, et al., "Transposed Picture Ordering for Dynamic Light Field Coding," Joint Video Team (JVT) of ISO/IEC MPEG & ITU-T VGEG (ISO/IEC JTC1/SC29/WG11 and ITU-T SG16 Q6), Jul. 9, 2004, 8 pages.

Grzeszczuk, R., et al., "Standard Support for 1-13 Progressive Encoding, Compression and Interactive Visualization of Surface Light Fields," Joint Video Tem (JVT) of ISO/IEC MPEG & ITU-T VGEG (ISO/IEC JTC1/SC29/WG11 and ITU-T SG16 Q6), Nov. 21, 2001, 11 pages.

Chang, et al., "Light Field Compression Using Disparity-Compensated Lifting and Shape Adaptation," IEEE Transactions on Image Processing, vol. 15, No. 4, Apr. 2006, pp. 793-806.

(56) References Cited

OTHER PUBLICATIONS

Sebe, et al., "Mutli-View Geometry Estimation for Light Field Compression," VMV 2002, 8 pages.
Borman, S., and Stevenson, R., "Super-resolution from image sequences—a review", Proceedings of the 1998 Midwest Symposium on Circuits and Systems, Publication Date: Aug. 9-12, 1998, on pp. 374-378.
Elad, M., and Feuer, A., "Restoration of a single superresolution image from several blurred, noisy, and undersampled measured images," IEEE Transactions on Image Processing Dec. 1997, pp. 1646-1658.
Farsiu, S., Robinson, D., Elad, M., and Milanfar, P., "Advances and challenges in super-resolution," International Journal of Imaging Systems and Technology, 2004, 12 pages.
Park, S., Park, M., and Kang, M., "Super-resolution image reconstruction: a technical overview," Signal Processing Magazine, 2003, 16 pages.
David E. Roberts, History of Lenticular and Related Autostereoscopic Methods, 2003, 17 pages.
Fife K., Gamal A. E., Wong H.-S. P.: A 3mpixel multi-aperture image sensor with 0.7um pixels in 0.11um cmos. In IEEE ISSCC Digest of Technical Papers (Feb. 2008), pp. 48-49.
Lumsdaine A., Georgiev T.: Full Resolution Lightfield Rendering. Tech. rep., Adobe Systems, Jan. 2008, 12 pages.
Baker S., Kanade T.: Limits on superresolution and how to break them. IEEE Transactions on Pattern Analysis and Machine Intelligence (Jan. 2002), 377 pages.
Bishop T. E., Zanetti S., Favaro P.: Light field superresolution. In International Conference on Computational Photography (Apr. 16-17, 2009), 4 pages.
Levin A., Fergus R., Durand F., Freeman W.: Image and depth from a conventional camera with a coded aperture. ACM Transactions on Graphics, SIGGRAPH 2007 Conference Proceedings, San Diego, CA (2007), 10 pages.
Lumsdaine A., Georgiev T.: The focused plenoptic camera. In International Conference on Computational Photography (Apr. 2009), 8 pages.
Ng M. K., Bose N. K.: Mathematical analysis of super-resolution methodology. Signal Processing Magazine, IEEE 20, 3 (2003), 62-74.
Schultz R.: Super-resolution enhancement of native digital video versus digitized NTSC sequences. In Proceedings of the Fifth IEEE Southwest Symposium on Image Analysis and Interpretation (2002), pp. 193-197.
Levoy, et al. "Recording and controlling the 4D light field in a microscope using microlens arrays", Journal of Microscopy, 2009, 19 pages.
Dana Dudley, Walter Duncan, John Slaughter, "Emerging Digital Micromirror Device (DMD) Applications", DLPTM Products New Applications, Texas Instruments, Inc., Copyright 2003 Society of Photo-Optical Instrumentation Engineers., This paper was published in SPIE Proceedings vol. 4985, 12 pages.
Shree K. Nayar, Vlad Branzoi, Terry E. Boult, "Programmable Imaging using a Digital Micromirror Array", Shree K. Nayar, Vlad Branzoi, Terry E. Boult, In Conf. on Computer Vision and Pattern Recognition, pp. I: 436-443, 2004.
U.S. Appl. No. 12/574,183, filed Oct. 6, 2009.
U.S. Appl. No. 11/627,141, filed Jan. 25, 2007.
U.S. Appl. No. 12/144,411, filed Jun. 23, 2008.
U.S. Appl. No. 12/186,396, filed Aug. 5, 2008.
U.S. Appl. No. 11/874,611, filed Oct. 18, 2007.
U.S. Appl. No. 12/111,735, filed Apr. 29, 2008.
U.S. Appl. No. 12/271,389, filed Nov. 14, 2008.
U.S. Appl. No. 12/474,112, filed May 28, 2009.
U.S. Appl. No. 12/130,725, filed May 30, 2008.
U.S. Appl. No. 12/636,168, filed Dec. 11, 2009.
U.S. Appl. No. 12/690,869, filed Jan. 20, 2010.
U.S. Appl. No. 12/690,871, filed Jan. 20, 2010.
U.S. Appl. No. 12/503,803, filed Jul. 15, 2009.
U.S. Appl. No. 12/628,437, filed Dec. 1, 2009.
U.S. Appl. No. 12/790,677, filed May 28, 2010.
U.S. Appl. No. 12/917,984, filed Nov. 2, 2010.
U.S. Appl. No. 12/957,308, filed Nov. 30, 2010.
T. Adelson and J. Bergen, "The plenoptic function and the elements of early vision," in Computational models of visual processing (MIT Press, 1991), 18 pages.
Tanida, J. Yamada, K., "TOMBO: thin observation module by bound optics," Lasers and Electro-Optics Society, 2002. LEOS 2002. The 15th Annual Meeting of the IEEE, Issue Date: 2002, pp. 233-234 vol. 1.
M Christensen, M Haney, D Rajan, S Douglas, and S Wood, "Panoptes: A thin agile multi-resolution imaging sensor," Government Microcuircuit Applications and Critical, Technology Conference (GOMACTech-05)(Jan. 2005), 4 pages.
D Capel and A Zisserman, "Computer vision applied to super resolution," Signal Processing Magazine(Jan. 2003), 10 pages.
P Sloan, M Cohen, and S Gortler, "Time critical lumigraph rendering," Proceedings of the 1997 symposium on Interactive 3D graphics (Jan. 1997), 7 pages.
John Nickolls, Ian Buck, Michael Garland, and Kevin Skadron, "Scalable parallel programming with cuda," Queue 6, 40-53 (2008), 40 pages.
John E. Stone, David Gohara, and Guochun Shi, "OpenCL—The open standard for parallel programming of heterogeneous systems." Comput. in Sci. and Eng., 12:66-73, 2010, 66 pages.
"PyOpenGL, The Python OpenGL® Binding" downloaded from http://pyopengl.sourceforge.net/ on Dec. 21, 2010, 2 pages.
Mark Segal, Kurt Akeley. The OpenGL Graphics System: A Specification (Version 3.2 (Core Profile)—Dec. 7, 2009), 104 pages.
John Kessenich, Dave Baldwin, Randi Rost. The OpenGL Shading Language, Version: 4.00, Document Revision: Feb. 7, 12, 2010, 160 pages.
S Todt, C Rezk-Salama, A Kolb, and K.-D Kuhnert, "Fast (Spherical) Light Field Rendering with Per-Pixel Depth," Technical Report, Computer Graphics Group, University of Siegen, 2007, 8 pages.
JP504669 (1975), all pages, english equivalent is U.S. Patent 3985419, dated Oct. 12, 1976 by Matsumoto, et al.
"Final Office Action", U.S. Appl. No. 12/957,312, (Jun. 6, 2013),16 pages.
"Final Office Action", U.S. Appl. No. 12/957,320, (Jun. 27, 2013),16 pages.
"Non-Final Office Action", U.S. Appl. No. 12/957,308, (Jul. 25, 2013),18 pages.
"Notice of Allowance", U.S. Appl. No. 13/434,189, (Jul. 10, 2013), 8 pages.
"Supplemental Notice of Allowance", U.S. Appl. No. 12/186,392, (Jul. 19, 2013), 5 pages.
"European Search Report", EP Application No. 09159086.9, (Aug. 14, 2009), 8 pages.
"Final Office Action", U.S. Appl. No. 13/425,306, (Sep. 19, 2012), 7 pages.
"Final Office Action", U.S. Appl. No. 12/130,725, (Jan. 3, 2012), 6 pages.
"Non-Final Office Action", U.S. Appl. No. 12/111,735, (Jul. 28, 2011), 12 pages.
"Non-Final Office Action", U.S. Appl. No. 12/130,725, (Sep. 9, 2011), 7 pages.
"Non-Final Office Action", U.S. Appl. No. 12/186,392, (Apr. 3, 2012), 13 pages.
"Non-Final Office Action", U.S. Appl. No. 12/186,392, (Nov. 19, 2012), 13 pages.
"Non-Final Office Action", U.S. Appl. No. 12/271,389, (Sep. 30, 2010), 7 pages.
"Non-Final Office Action", U.S. Appl. No. 12/474,112, (Oct. 19, 2011), 5 pages.
"Non-Final Office Action", U.S. Appl. No. 12/628,437, (Jul. 30, 2012), 10 pages.
"Non-Final Office Action", U.S. Appl. No. 12/957,312, (Nov. 13, 2012), 14 pages.
"Non-Final Office Action", U.S. Appl. No. 12/957,320, (Dec. 5, 2012), 11 pages.
"Non-Final Office Action", U.S. Appl. No. 13/103,880, (Aug. 9, 2011), 5 pages.

(56) References Cited

OTHER PUBLICATIONS

"Non-Final Office Action", U.S. Appl. No. 13/425,306, (May 31, 2012), 7 pages.
"Non-Final Office Action", U.S. Appl. No. 13/476,638, (Jul. 6, 2012), 6 pages.
"Notice of Allowance", U.S. Appl. No. 12/917,984, (Aug. 21, 2012), 11 pages.
"Notice of Allowance", U.S. Appl. No. 12/111,735, (Dec. 14, 2011), 10 pages.
"Notice of Allowance", U.S. Appl. No. 12/130,725, (Apr. 3, 2012), 8 pages.
"Notice of Allowance", U.S. Appl. No. 12/271,389, (Feb. 2, 2011), 4 pages.
"Notice of Allowance", U.S. Appl. No. 12/271,389, (Jun. 18, 2010), 6 pages.
"Notice of Allowance", U.S. Appl. No. 12/474,112, (Jan. 30, 2012), 5 pages.
"Notice of Allowance", U.S. Appl. No. 12/503,803, (Mar. 20, 2012), 6 pages.
"Notice of Allowance", U.S. Appl. No. 12/628,437, (Dec. 18, 2012), 6 pages.
"Notice of Allowance", U.S. Appl. No. 13/103,880, (Dec. 13, 2011), 5 pages.
"Notice of Allowance", U.S. Appl. No. 13/425,306, (Dec. 10, 2012), 4 pages.
"Notice of Allowance", U.S. Appl. No. 13/429,226, (Dec. 26, 2012), 7 pages.
"Notice of Allowance", U.S. Appl. No. 13/476,638, (Oct. 29, 2012), 4 pages.
"PyOpenGL 3.x The Python OpenGL Binding", Retrieved from <http://pyopengl.sourceforge.net> on Dec. 21, 2010, 2 pages.
"Restriction Requirement", U.S. Appl. No. 12/111,735, (Apr. 29, 2011), 6 pages.
"Restriction Requirement", U.S. Appl. No. 12/130,725, (Jul. 15, 2011), 5 pages.
"Restriction Requirement", U.S. Appl. No. 12/474,112, (Jul. 28, 2011), 6 pages.
"Restriction Requirement", U.S. Appl. No. 12/957,316, (Jan. 23, 2013), 6 pages.
"Supplemental Notice of Allowance", U.S. Appl. No. 12/271,389, (Feb. 10, 2011), 2 pages.
"Supplemental Notice of Allowance", U.S. Appl. No. 12/474,112, (Mar. 8, 2012), 2 pages.
"Supplemental Notice of Allowance", U.S. Appl. No. 12/503,803, (Apr. 23, 2012), 13 pages.
"Supplemental Notice of Allowance", U.S. Appl. No. 13/103,880, (Jan. 20, 2012), 2 pages.
"U.S. Application as Filed", U.S. Appl. No. 11/627,141, (Jan. 25, 2007), 43 pages.
"U.S. Application as Filed", U.S. Appl. No. 11/874,611, (Oct. 18, 2007), 43 pages.
"U.S. Application as Filed", U.S. Appl. No. 12/111,735, (Apr. 29, 2008), 44 pages.
"U.S. Application as Filed", U.S. Appl. No. 12/186,396, (Aug. 5, 2008), 69 pages.
"U.S. Application as Filed", U.S. Appl. No. 12/271,389, (Nov. 14, 2008), 63 pages.
"U.S. Application as Filed", U.S. Appl. No. 12/474,112, (May 28, 2009), 75 pages.
"U.S. Application as Filed", U.S. Appl. No. 12/636,168, (Dec. 11, 2009), 60 pages.
"U.S. Application as Filed", U.S. Appl. No. 12/690,569, (Jan. 20, 2010), 36 pages.
"U.S. Application as Filed", U.S. Appl. No. 12/690,871, filed Jan. 20, 2010, 105 pages.
"U.S. Application as Filed", U.S. Appl. No. 12/917,984, filed Nov. 2, 2010, 127 pages.
"U.S. Application as Filed", U.S. Appl. No. 12/957,312, filed Nov. 30, 2010, 91 pages.
"U.S. Application as Filed", U.S. Appl. No. 12/957,316, filed Oct. 30, 2010, 66 pages.
"U.S. Application as Filed", U.S. Appl. No. 12/957,320, filed Nov. 30, 2010, 58 pages.
"U.S. Application as Filed", U.S. Appl. No. 12/957,322, filed Nov. 30, 2010, 53 pages.
"U.S. Application as Filed", U.S. Appl. No. 12/957,326, filed Nov. 30, 2010, 73 pages.
"U.S. Application as Filed", U.S. Appl. No. 13/288,759, filed Nov. 3, 2011, 54 pages.
"U.S. Application as Filed", U.S. Appl. No. 13/288,765, filed Nov. 3, 2011, 50 pages.
"U.S. Application as Filed", U.S. Appl. No. 13/429,765, filed Mar. 23, 2012 filed , 44 pages.
"US Application as Filed", U.S. Appl. No. 13/429,226, filed Mar. 23, 2012 filed , 44 pages.
Adelson, et al., "Single lens stereo with a plenoptic camera", *IEEE Transactions on Pattern Analysis D and Machine Intelligence*, val. 14, issue 2, 99-106, 1992, (1992), pp. 99-106.
Adelson, et al., "The Plenoptic Function and the Elements of Early Vision", *Computational models of visual processing (MIT Press)*, (1991), 18 pages.
Aggarwal, Manoj et al., "Split Aperture Imaging for High Dynamic Range", *International Journal of Computer Vision*, (Jan. 2004), 8 pages.
Baker, et al., "Limits on Superresolution and How to Break Them", *IEEE Transactions on Pattern Analysis and Machine Intelligence*, (Jan. 2002), 37 pages.
Bishop, et al., "Light Field Superresolution", *In International Conference on Computational Photography* (Apr. 16-17, 2009), (Apr. 16, 2009), 4 pages.
Borman, et al., "Super-resolution from image sequences—a review", *Proceedings of the 1998 D Midwest Symposium on Circuits and Systems*, Publication Date: Aug. 9-12, 1998, On pp. 374-378, 5 pages.
Brown, et al., "Unsupervised 3D Object Recognition and Reconstruction in Unordered Datasets", In *Proceedings of 5th International Conference on 3D Imaging and Modelling* (i 301Ml ), (2005), 8 pages.
Capel, et al., "Computer Vision Applied to Super-resolution", *IEEE Signal Processing Magazine*, vol. 20, (Jan. 2003), 10 pages.
Chai, et al., "Plenoptic Sampling", *ACM Transactions Graphics*, (2000),12 pages.
Chang, et al., "Light Field Compression Using Disparity-Compensated Lifting and Shape Adaptation", *IEEE Transactions on Image Processing*, vol. 15, No. 4, (Apr. 2006), pp. 793-806.
Christensen, et al., "PANOPTES: A thin agile multi-resolution imaging sensor", *Microcuircuit Applications and Critical, Technology Conference (GOMACTech-05)*, (Jan. 2005), 4 Pages.
Debevec, Paul E., et al., "Recovering High Dynamic Range Radiance Maps from Photographs", *ACM Transaction on Graphics, SIGGRAPH 1997 Conference Proceedings*, San Diego, CA, (1997), 10 pages.
Dudley, Dana et al., "Emerging Digital Micromirror Device (DMD) Applications", DLPTM Products New Applications, Texas Instruments, Inc., Copyright 2003 Society of Photo-Optical Instrumentation Engineers., This paper was published in *SPIE Proceedings* vol. 4985, (2003), 12 pages.
Durand, et al., "A Frequency Analysis of Light Transport", *ACM Transactions Graphipcs* , (2005), 12 pages.
Durand, Fredo "Fast Bilateral filtering for the Display of High-Dynamic-Range Images", *ACM Transactions on Graphics (TOG), Proceedings of the 29th Annual Conference on Computer Graphics and Interactive Techniques SIGGRAPH-02*, vol. 21, Issue 3, (2002), 10 pages.
Elad, et al., "Restoration of a single supperresolution image from several blurred, noisy, and undersampled measured images", *IEEE Transactions on Image Processing* Dec. 1997, pp. 1646-1658.
Farsiu, et al., "Advances and challenges in super-resolution", *International Journal of Imaging Systems and Technology*, 2004, pp. 47-57.

(56) References Cited

OTHER PUBLICATIONS

Fecker, Ulrich et al., "Transposed Picture Ordering for Dynamic Light Field Coding", Joint Video Team (JVT) of ISO/ IEC MPEG & ITU-T VGEG (ISO/IEC JTC1/SC29/WG11 and ITU-T SG16 06), (Jul. 9, 2004), 8 pages.

Ferrand, et al., "Direct imaging of photonic nanojets", *Optics Express* vol. 16, No. 10, (May 12, 2008), pp. 6930-6940.

Fife, Keith et al., "A 3Mpixel Multi-Aperture Image Sensor With 0.7um Pixels in 0.11um CMOS", *IEEE ISSCC Digest of Technical Papers* (Feb. 2008), pp. 48-49, available at <http://isl.stanford.edu/groups/elgamal/people/kfife/>,(Feb. 2008), 3 pages.

GeorgieV, "U.S. Application as Filed", U.S. Appl. No. 12/144,411, filed Jun. 23, 2008, 63 pages.

Georgiev, "U.S. Application as Filed", U.S. Appl. No. 12/574,183, filed Oct. 6, 2009, 30 pages.

Georgiev, "U.S. Application as Filed", U.S. Appl. No. 12/790,677, filed May 28, 2010, 48 pages.

Georgiev, et al., "Depth of Field in Plenoptic Cameras", *In Eurographics 2009-Annex*, (Apr. 2009), 4 pages.

Georgiev, et al., "Light Field Camera Design for Integral View Photography", *Adobe Systems Technical Report*, (2006), 13 pages.

Georgiev, et al., "Light-Field Capture by Multiplexing in the Frequency Domain", *Adobe Technica 1 Report*, (Apr. 2007), 14 pages.

Georgiev, et al., "Morphing Between Multiple Images", *Southern Illinois University at Carbondale, Dept. of Computer Science, Technical Report*, (Apr. 17, 1997), 17 pages.

Georgiev, et al., "Spatio-angular resolution tradeoff in integral photography", *Proc. Eurographics Symposium on Rendering*, 2006, 10 pages.

Georgiev, et al., "U.S. Application as Filed", U.S. Appl. No. 12/690,869, filed Jan. 20, 2010, 103 pages.

Georgiev, et al., "U.S. Application as Filed", U.S. Appl. No. 12/503,803, filed Jul. 15, 2009, 114 pages.

Georgiev, et al., "U.S. Application as Filed", U.S. Appl. No. 12/628,437, filed Dec. 1, 2009, 114 pages.

Gortler, et al., "The Lumigraph", *ACM Trans. Graph.*, 43-54, 1996, pp. 43-54.

Grzeszczuk, et al., "Standard Support for Progressive Encoding, Compression and Interactive Visualization of Surface Light Fields", Joint Video Tern (JVT) of ISO/IEC MPEG & ITU-T VGEG (ISO/IEC JTC1/SC29/WG11 and ITU-T SG16 06), (Nov. 21, 2001), 11 pages.

Guttosch, Rudolph J., "Investigation of Color Aliasing of High Spatial Frequencies and Edges for Bayer-Pattern Sensors and Foveon X3 Direct Image Sensors", *Tech. Rep., Foveon*, 2002, 8 pages.

Horstmeyer, R et al., "Flexible multimodal camera using a light field architecture.", In *Proceedings ICCP 2009*, 2009., pp. 1-8

Horstmeyer, Roarke et al., "Modified light field architecture for reconfigurable multimode imaging", In *Adaptive Coded Aperture Imaging, Non-Imaging, and Unconventional Imaging Sensor Systems. SPIE*, 2009., 9 pages.

Horstmeyer, Roarke et al., "Pupil plane multiplexing for multi-domain imaging sensors.", In *Society of Photo-Optical Instrumentation Engineers (SPIE) Conference Series*, vol. D 7096, Aug. 2008., 10 pages.

Hubel, Paul M., "Foveon Technology and the Changing Landscape of Digital Cameras" *Thirteenth Color Imaging Conference: Color Science and Engineering Systems, Technologies, and Applications*, Scottsdale, Arizona, (Nov. 2005), pp. 314-317.

Hubel, Paul M., et al., "Spatial Frequency Response of Color Image Sensors: Bayer Color Filters and Foveon X3", *Proceedings of the SPIE*, vol. 5301, (2004), pp. 1-4.

Intwala, et al., "U.S. Application as Filed", U.S. Appl. No. 12/130,725, (May 30, 2008), 52 pages.

Isaksen, Aaron, "Dynamically Reparameterized Light Fields", *Submitted to the Science in partial fulfillment of the requirements for the degree of Master of Science in Electrical Engineering and Computer Science at the Massachusetts Institute of Technology.*, (Nov. 2000), 79 pages.

Isaksen, et al., "Dynamically reparameterized light fields", *ACM Trans. Graph.*, 297-306, 2000, (2000), pp. 297-306.

Kessenich, et al., "The OpenGL Shading Language", *Version: 4.00, Document Revision: 7*, (Feb. 12, 2010), 160 pages.

Lee, et al., "Polymorph: Morphing Among Multiple Images", *IEEE Computer Graphics and Applications*, (1998), p. 60-73.

Levin, et al., "Image and Depth from a Conventional Camera with a Coded Aperture", *ACM Transactions on Graphics, SIGGRAPH 2007 Conference Proceedings*, San Diego, CA, Retrieved from <http://groups.csail.mit.edu/graphics/CodedAperture/CodedAperture-LevinEtAl-SIGGRAPH07.pdf>on Dec. 21, 2012,(2007), 9 pages.

Levoy, et al., "Light Field Rendering", *ACM Trans. Graph.*, 31-42, 1996, pp. 31-42.

Levoy, et al., "Recording and Controlling the 4D Light Field in a Microscope Using Microlens Arrays", *Journal of Microscopy*, vol. 235, Pt 2, (Apr. 7, 2009), 19 pages.

Levoy, Marc "Light Fields and Computational Imaging", *Computer [Online]*, vol. 39, No. 8, XP002501300, (Aug. 2006), pp. 46-55.

Levoy, Mark et al., "Light Field Microscopy", ACM Transactions on Graphics 25(3), *Proceedings of SIGGRAPH*, (2006), 11 pages.

Levoy, Mary "Optical Recipes for Light Microscopes", *Stanford Computer Grpahics Laboratory Technical Memo 2006-001*, (Jun. 20, 2006), 5 pages.

Lin, Zhouchen "Fundamental Limits of Reconstruction-Based Superresolution Algorithms under Local Translation", *IEEE Transactions on Pattern Analysis and Machine Intelligence 26, 1* (Jan. 2004), 83-97, available at <http://research.microsoft.com/apps/pubs/defaultaspx?id=69073>, (Jan. 2004), pp. 83-97.

Lippmann, "Epreuves Reversible Donnant la Sensation Du Relief ("Reversible Prints Providing the Sensation of Depth")", *Journal of Physics 7*, (1908), pp. 821-825.

Lippmann, "Reversibles Prints", *Academie des sciences*, (Mar. 1908), 3 pages.

Lippmann, M.G. "Epreuves Reversibles Photographies Integrales ("Reversible Prints. Integral Photographs.")", *Academie des sciences*, Translation,(Mar. 1908), 4 Pages.

Lumsdaine, Andrew et al., "Full Resolution Lightfield Rendering", *Adobe Systems Technical Report*, (Jan. 2008), 12 pages.

Lumsdaine, et al., "The Focused plenoptic Camera", In *International Conference on Computational Photography*, (Apr. 2009), 8 pages.

Lyon, Richard F., et al., "Eyeing the Camera: into the Next Century", In *Proceedings IS&T/SID 10th Color Imaging Conference*, (2002), 7 pages.

Naemura, et al., "3D Computer Graphics Based on Integral Photography", *Optics Express*, vol. 8, 2, (2001), 8 pages.

Narasimhan, Srinivasa G., et al., "Enhancing resolution along multiple imaging dimensions using pixels.", *IEEE Trans. Pattern Anal. Mach. Intel I.*, 27(4 ), (Apr. 2005), pp. 518-530.

Nayar, et al., "High Dynamic Range Imaging: Spatially Varying Pixel Exposures", *IEEE Conference on Computer Vision and Pattern Recognition*, Jun. 2000, vol. 1, pp. 4 72-4 79., 8 pages.

Nayar, Shree N., et al., "Programmable Imaging using a Digital Micromirror Array", In *Conf. on Computer Vision and Pattern Recognition*, pp. 1: 436-443, 2004, 8 pages.

Neumann, et al., "Eyes from Eyes Analysis of Camera Design Using Plenoptic Video Geometry", XP002509893, (Dec. 2001), 20 pages.

Ng, "Digital Light Field Photgraphy", *A Dissertation Submitted to the Dept. of Computer Science and the Commitiee on Graduate Studies of Stanford Univ in Partial fulfillment of the requirements for the degree of Doctor of Philosophy*, 203, (Jul. 2006), 203 pages.

Ng, "Fourier slice photography", *International Conference on Computer Graphics and of Interactive Techniques Proceedings of ACM SIGGRAPH 2005.*, (2005), 10 pages.

Ng, et al., "Light field photgraphy with a hand-held plenoptic camera", *Stanford University Computer Science Tech Report CSTR 2005-02*, Apr. 2005, 11 pages.

Ng, et al., "Mathematical Analysis of Super-Resolution Methodology", *Signal Processing Magazine*, IEEE 20, 3 (2003), pp. 62-74.

Nickolls, et al., "Scalable Parallel Programming with CUDA", *Queue 6*, 40-53, (Mar. 2008), 14 pages.

Park, Cheol S., et al., "Super-Resolution Image Reconstruction: A Technical Overview", *IEEE Signal Processing Magazine*, vol. 20, Issue 3 (May 2003), 16 pages.

(56) References Cited

OTHER PUBLICATIONS

Park, Jong H., et al., "An Ultra Wide Dynamic Range CMOS Image Sensor with a Linear Response", *Proceedings SPIE-IS&T Electronic Imaging, SPIE* vol. 6068, 2006., 8 pages.

Roberts, David E., "History of Lenticular and Related Autostereoscopic Methods", available at <ftp://ftp.umiacs.umd.edu/pub/aagrawal/HistoryOfIntegralImaging/HistoryOfLenticular.pdf>, (2003), 17 pages.

Schechner, Yoav Y., et al., "Generalized mosaicing", In *ICCV*, pp. 17-25, 2001., 8 pages.

Schechner, Yoav Y., et al., "Generalized Mosaicing: High Dynamic Range in a Wide Field of View", *International Journal of Computer Vision*, 53(3):245-267, (2003), 23 pages.

Schechner, Yoav Y., et al., "Generalized mosaicing: Polarization panorama", *IEEE Trans. Pattern Anal. Mach. Intell.*, 27(4):631-636, 2005., pp. 631-636.

Schechner, Yoaz et al."Generalized mosaicing: Wide field of view multispectral imaging", IEEE Trans. Pattern Anal. Mach. Intell., 24(10):1334-1348, 2002., (Oct. 2002), pp. 1334-1348.

Schultz, Richard R.,"Super-Resolution Enhancement of Native Digital Video Versus Digitized NTSC Sequences", In *Proceedings of the Fifth IEEE Southwest Symposium on Image Analysis and Interpretation*, (2002), 5 pages.

Sebe, et al., "Multi-View Geometry Estimation for Light Field Compression", VMV 2002, 8 pages.

Segal, et al., "The OpenGL Graphics System: A Specification", *Version 3.2 (CoreProfile)*, (Dec. 7, 2009), 404 pages.

Seitz, et al., "View Morphing", *ACM Transactions Graphics*, (1996), 10 pages.

Shing-Chow, et al., "The Compression of Simplified Dynamic Light Fields", *Proceedings of International Conference on Acoustics, Speech and Signal Processing*, Apr. 6-10, 2003, Hong Kong, val. 3, (Apr. 6, 2003), 4 pages.

Shum, Heung-Yeung et al., "Survey of Image-Based Representations and Compression Techniques", *IEEE Transactions on Circuits and Systems for Video Technology, IEEE Service Center*, vol. 13. No. 11, (Nov. 1, 2003), 18 pages.

Sloan, et al., "Time Critical Lumigraph Rendering", *Proceedings of the 1997 symposium on Interactive 3D graphics*, (Jan. 1997), 7 pages.

Stevens, et al., "Lens Arrays for a Three-dimensional Imaging System", *Journal of Optics A: Pure and Applied Optics, Opt. 4*, (2002), 5 pages.

Stewart, et al., "A New Reconstruction Filter for Undersampled Light Field", *Eurographics Symposium on Rendering*, (2003), 8 pages.

Stone, et al., "OpenCL: The open standard for parallel programming of heterogeneous systems", *Computing In Science & Engineering*, (May 2010), 8 pages.

Tanida, et al., "TOMBO: Thin Obeservation Module by Bound Optics", *Lasers and Electro-Optics Society*, 2002. LEOS 2002. The 15th Annual Meeting of the IEEE, vol. 1 (2002), pp. 233-234.

Todt, et al., "Fast (Spherical) Light Field Rendering with Per-Pixel Depth", *Technical Report, Computer Graphics Group*, University of Siegen, (2007), 8 pages.

Tumblin, Jack et al., "LCIS: A Boundary Hierarchy for Detail-Preserving Contrast Reduction", ACM Transactions on Graphics, SIGGRAPH 1999 Conference Proceedings, Los Angeles, CA, pp. 83-90, 1999., pp. 83-90.

Vaish, Vaibhav et al., "Using Plane+ Parallax to Calibrate Dense Camera Arrays", In *Proceedings of IEEE Conference on Computer Vision and Pattern Recognition (CVPR)*, (2004), 8 pages.

Veeraraghavan, et al., "Dappled photography: Mask enhanced cameras for heterodyned light fields and coded aperture refocusing", ACM Trans. Graph. 26, 3, 69, 2007, 14 pages.

Wang, et al., "Optical virtual imaging at 50 nm lateral resolution with a white-light nanoscope", *Nature Communications*, (Mar. 1, 2011), 13 pages.

Wang, et al., "The optical microscopy with virtual image breaks a record: 50-nm resolution imaging is demonstrated", *Cornell University Library*, (Jun. 2010), 7 pages.

Wilburn, Bennett et al., "High Performance Imaging Using Large Camera Arrays", In *ACM Transactions Graphics*, (2005), 12 pages.

Wu, et al., "Imaging with Solid Immersion Lenses, Spatial Resolution and Applications", *Proc. IEEE 88, 1491*, (2000), 8 pages.

Wu, et al., "Realization of numerical aperture 2.0 using a gallium phosphide solid immersion lens", *Applied Physics Letters 75*, (1999), 3 pages.

Xiao, Jiangjian et al., "Tri-view Morphing", *Computer Vision and Image Understanding 96, 3*, (2004), pp. 345-366.

Yang, et al., "A Real-Time Distributed Light Field Camera", *Rendering Techniques 2002, Eurographics Workshop Proceedings, PIS*, Italy, June. 26-28, 2002, (Jun. 26, 2002), 9 pages.

Zaharia, et al., "Adaptive 3D-DCT Compression Algorithm for Continuous Parallax 3D Integral Imaging", *Signal Processing, Image Communication, Elsevier Scient Publishers*, Amsterdam, NL, vol. 17, No. 3, (Mar. 1, 2002), 12 pages.

Zhang, et al., "A Survey on Image-based Rendering-Representation, Sampling and Compression", *Signal Processing, Image Communication, Elsevier Science Publishers*, vol. 19, No. 1, (Jan. 1, 2004), 28 pages.

Zitnick, et al., "Consistent Segmentation for Optical Flow Estimation", In *Proceedings of IEEE International Conference on Computer Vision (ICCV)*, (2005), 8 pages.

"Final Office Action", U.S. Appl. No. 12/957,322, (Aug. 12, 2013), 16 pages.

"Non-Final Office Action", U.S. Appl. No. 12/957,312, (Aug. 28, 2013), 17 pages.

"Supplemental Notice of Allowance", U.S. Appl. No. 12/186,392, (Aug. 27, 2013), 2 pages.

"Non-Final Office Action", U.S. Appl. No. 12/957,316, (Mar. 22, 2013), 16 pages.

"Non-Final Office Action", U.S. Appl. No. 12/690,869, (Mar. 26, 2012), 8 pages.

"Non-Final Office Action", U.S. Appl. No. 12/957,322, (Apr. 24, 2013), 15 pages.

"Non-Final Office Action", U.S. Appl. No. 13/434,189, (Mar. 7, 2013), 8 pages.

"Notice of Allowance", U.S. Appl. No. 12/186,392, (Mar. 13, 2013), 8 pages.

"Notice of Allowance", U.S. Appl. No. 12/690,869, (Jul. 13, 2012), 7 pages.

"Notice of Allowance", U.S. Appl. No. 13/549,330, (Feb. 7, 2013), 9 pages.

Aliaga, et al., "Plenoptic Stitching: A Scalable Method for Reconstructing 30 Interactive Walkthroughs", *Proceedings of the 28th annual conference on Computer graphics and interactive techniques*, (Aug. 2001), pp. 443-450.

Hunt, B. R., "Super-Resolution of Images: Algorithms, Principles, Performance", *International Journal of Imaging Systems and Technology*, vol. 6, (Jan. 1995), 9 pages.

Meng, et al., "An Approach on Hardware Design for Computational Photography Applications based on Light Field Refocusing Algorithm", *Technical Reports CS-2007-15*, University of Virginia, (Nov. 18, 2007), pp. 1-12.

Ng, "Digital Light Field Photography," Jul. 2006, A Dissertation Submitted to the Dept. of Computer Science and the Committee on Graduate Studies of Stanford Univ in Partial fulfillment of the requirements for the degree of Doctor of Philosophy, 203.

Georgiev, et al. "Light-Field Capture by Multiplexing in the Frequency Domain," Adobe Technical Report, Apr. 2007, all pages.

"Final Office Action", U.S. Appl. No. 12/957,308, (Nov. 19, 2013), 21 pages.

"Final Office Action", U.S. Appl. No. 12/957,312, (Dec. 13, 2013), 15 pages.

"Final Office Action", U.S. Appl. No. 12/957,316, (Sep. 26, 2013), 16 pages.

"Non-Final Office Action", U.S. Appl. No. 13/288,759, (Sep. 11, 2013), 11 pages.

"Notice of Allowance", U.S. Appl. No. 12/957,316, (Dec. 11, 2013), 13 pages.

"Notice of Allowance", U.S. Appl. No. 12/957,320, (Oct. 16, 2013), 10 pages.

(56) References Cited

OTHER PUBLICATIONS

"Non-Final Office Action", U.S. Appl. No. 12/957,322, Jan. 13, 2014, 20 pages.
"Non-Final Office Action", U.S. Appl. No. 13/288,759, Apr. 28, 2014, 11 pages.
"Notice of Allowance", U.S. Appl. No. 12/957,308, Mar. 28, 2014, 7 pages.
"Notice of Allowance", U.S. Appl. No. 12/957,312, Feb. 26, 2014, 12 pages.
"Notice of Allowance", U.S. Appl. No. 12/957,322, Apr. 25, 2014, 7 pages.
"Supplemental Notice of Allowance", U.S. Appl. No. 12/957,320, Jan. 24, 2014, 2 pages.
"Supplemental Notice of Allowance", U.S. Appl. No. 12/957,320, Jan. 30, 2014, 2 pages.
Chang, et al.,"Super-Resolution through Neighbor Embedding", Computer Vision and Pattern Recognition, 2004. CVPR 2004. Proceedings of the 2004 IEEE Computer Society Conference, Jul. 2004, 8 pages.
"Supplemental Notice of Allowance", U.S. Appl. No. 12/957,308, Jun. 9, 2014, 2 pages.
"Non-Final Office Action", U.S. Appl. No. 13/288,765, Jun. 25, 2014, 20 pages.
"Notice of Allowance", U.S. Appl. No. 13/466,904, Jul. 18, 2014, 8 pages.

\* cited by examiner

BLENDED RENDERING OF FOCUSED PLENOPTIC CAMERA DATA

PRIORITY INFORMATION

This application claims benefit of priority of U.S. Provisional Application Ser. No. 61/310,203 entitled "Focused Plenoptic Camera and Rendering" filed Mar. 3, 2010, the content of which is incorporated by reference herein in its entirety.

BACKGROUND

Description of the Related Art

In contrast to conventional cameras, light-field, or radiance capturing, cameras sample the four-dimensional (4-D) optical phase space or light-field, and in doing so capture information about the directional distribution of the light rays. This information captured by light-field cameras may be referred to as the light-field, the plenoptic function, or radiance. In computational photography, a light-field is a 4-D record of all light rays in 3-D. Radiance describes both spatial and angular information, and is defined as density of energy per unit of area per unit of stereo angle (in radians). A light-field camera captures radiance; therefore, light-field images originally taken out-of-focus may be refocused, noise may be reduced, viewpoints may be changed, and other light-field effects may be achieved.

Plenoptic cameras, constructed with internal microlens arrays, capture both spatial and angular information, i.e., the full four-dimensional (4D) radiance, of a scene. By capturing the full 4D radiance, plenoptic cameras may produce effects beyond the capabilities of traditional cameras. Image properties such as focus and depth of field may be adjusted after an image had been captured. However, images rendered from data captured using conventional plenoptic cameras are of relatively low resolution. The design of conventional plenoptic cameras assumes that each microlens image is completely defocused with respect to the image created by the main camera lens. As a result, only a single pixel in the final image is rendered from each microlens image, resulting in low resolution. For example, images rendered from data captured with an example conventional plenoptic camera have a final resolution of only 300×300 pixels.

SUMMARY

Various embodiments of methods, apparatus, and computer-readable storage media for rendering focused plenoptic camera data are described. Focused plenoptic camera technology, in combination with full resolution light-field rendering techniques as described herein, can produce final images at significantly higher resolution than can be rendered from light-field images captured with conventional plenoptic camera technology. Rendering techniques are described that include a rendering with blending technique, and a combined depth-based rendering and rendering with blending technique.

In embodiments of the rendering with blending rendering technique, a flat including a plurality of microimages of separate portions of an image of a scene is obtained. To render an output image of the scene from the plurality of separate microimages, each point in the output image is rendered by blending values from multiple microimages. In at least some embodiments, to render a given point in the output image, a target microimage in the flat is determined for this point. A position in the target microimage from which a value is to be sampled is calculated. For each microimage in a neighborhood including the target image (e.g., a 3×3 neighborhood), a value from the calculated position in the respective microimage is calculated, and the value is added to a value accumulator. In at least some embodiments, the value may be weighted according to the position of the respective microimage in the neighborhood before adding the value to the accumulator. In at least some embodiments, the weight used may also be added to a separate weight accumulator. The value in the value accumulator may be normalized, and the normalized value may be assigned to the point in the output image. In at least some embodiment, normalizing may be performed by dividing the accumulated value by the accumulated weight value. Other methods for normalizing, for example averaging, may be used in some embodiments.

In embodiments of a combined depth based rendering and rendering with blending technique, a flat including a plurality of microimages of separate portions of an image of a scene is obtained. For each of the plurality of microimages, a depth of a respective portion of the image of the scene is estimated. An output image of the scene is rendered from the plurality of separate microimages according to the estimated depths. Each point in the output image is rendered by blending values from multiple microimages in a neighborhood including the target microimage; the estimated depth for the target microimage applies to all of the microimages because the sampling position in the microimages is calculated according to the estimated depth for the target microimage.

In at least some embodiments, the rendering techniques described herein may be performed according to parallel processing technology that renders multiple points of the output image in parallel. In at least some embodiments, the parallel processing technology is graphical processing unit (GPU) technology.

Figure 1:
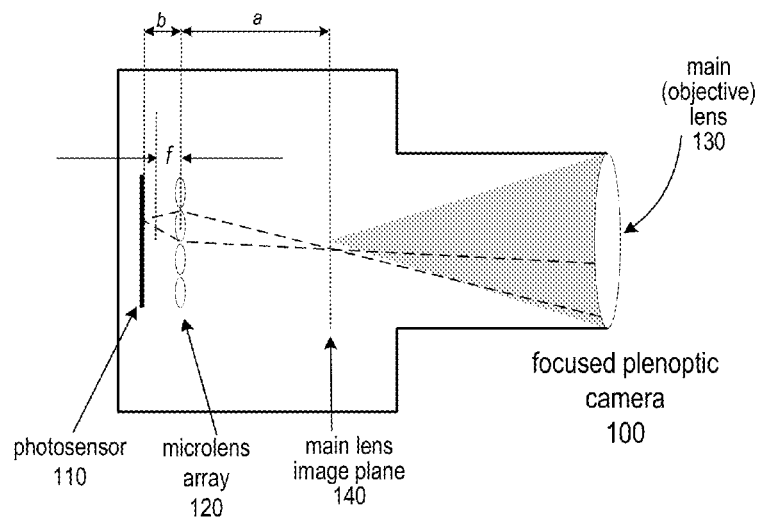
FIG. 1 graphically illustrates the focused plenoptic camera, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods, apparatus, and computer-readable storage media for rendering focused plenoptic camera data are described. Images rendered from data captured using conventional plenoptic cameras are of relatively low resolution. Focused plenoptic camera technology, in combination with full resolution light-field rendering techniques as described herein, can produce final images at significantly higher resolution. The focused plenoptic camera uses the microlens array as an imaging system focused on the image plane of the main camera lens. The flexible spatio-angular tradeoff that becomes available with focused plenoptic camera technology enables rendering of final images with significantly higher resolution than images rendered from data captured with conventional plenoptic cameras.

Various embodiments of full-resolution rendering techniques for producing high-quality, high-resolution images from data captured with the focused plenoptic camera are described. These techniques include a basic full-resolution rendering technique, a depth-based rendering technique, a rendering with blending technique, and a combined depth-based, rendering with blending technique. Implementations of these rendering techniques that are executable on parallel processing technology such as a graphics processing units (GPUs) are described; by subdividing the rendering process and executing parts of the process in parallel, these implementations are able to render full screen refocused images in real-time or near real-time.

Focused plenoptic camera technology and basic rendering techniques for focused plenoptic camera data are described in U.S. patent application Ser. No. 12/474,112, entitled "Methods and Apparatus for Full-Resolution Light-Field Capture and Rendering" filed May 28, 2009, the content of which is incorporated by reference herein in its entirety.

The focused plenoptic camera is structurally different from conventional plenoptic cameras with respect to at least microlens placement and microlens focus and, following from the structural differences, assumptions made about the sampling of the 4D radiance. The conventional plenoptic camera focuses the main lens on the microlenses and focuses the microlenses at infinity. In contrast, the focused plenoptic camera focuses the main camera lens in front of the microlenses and focuses the microlenses on the image formed inside the camera. Each microlens of the focused plenoptic camera forms a relay system with the main camera lens. This configuration produces a flexible trade-off in the sampling of spatial and angular dimensions and allows positional information in the radiance to be sampled more effectively than with the conventional plenoptic camera. As a result, the focused plenoptic camera can produce images of much higher resolution than can traditional plenoptic cameras.

Radiance Theory and Modeling

The radiance at a given plane perpendicular to the optical axis may be denoted by $r(q, p)$, where q and p represent position and direction in ray space, respectively. Compactly, a coordinate in ray space is represented by $x=(q, p)^T$. Rays are transformed by the application of optical elements. An arbitrary ray transfer matrix, A, transforms each ray according to:

$$x'=Ax. \quad (1)$$

Refraction by a lens and travel of rays in free space are respectively described by the matrix transforms L and T:

$$L = \begin{bmatrix} 1 & 0 \\ -\frac{1}{f} & 1 \end{bmatrix}, \quad (2)$$

$$T = \begin{bmatrix} 1 & t \\ 0 & 1 \end{bmatrix}.$$

Optical transforms of rays induce corresponding transforms of functions (such as radiance) defined on ray space. Let A be an optical transform of equation (1), and consider the induced transformation of $r(x)$ to $r'(x)$. Since all optical transfer matrices satisfy determinant (det) A=1, and assuming conservation of energy, this is the radiance conservation property of all optical systems, i.e., it must be the case that:

$$r'(x')=r(x).$$

Taken with $x'=Ax$, it must be the case that:

$$r'(Ax)=r(x).$$

Considering a ray $y=Ax$, the following is obtained:

$$r'(y)=r(A^{-1}y).$$

Since y is an arbitrary ray, the radiance transformation formula:

$$r'(x)=r(A^{-1}x) \quad (3)$$

is obtained. The intensity of an image at a given spatial point, denoted $I(q)$ is the integral of the radiance over all of the rays incident at that point, i.e., $$I(q)=\int_P r(q,p)dp. \quad (4)$$

The Conventional Plenoptic Camera

The conventional plenoptic camera is based on an array of microlenses at the image plane of the main camera lens, with the sensor placed one focal length behind the microlenses. The camera samples the radiance in front of the microlenses with a kernel. Each microlens image is a vertical stack of samples in the (q, p) plane, capturing strictly the angular distribution of the radiance at the image plane. In the conventional plenoptic camera, the main camera lens is focused one focal length in front of the microlenses. Consider one microlens. It can be shown that each pixel under it measures the energy coming to a plane one focal length in front of that microlens as rays at a specific for that pixel angle. To show this, the matrix A and $A^{-1}$ are computed for rays incident to a plane one focal length in front of a given microlens.

$$A = \begin{bmatrix} 1 & f \\ 0 & 1 \end{bmatrix} \begin{bmatrix} 1 & 0 \\ -\frac{1}{f} & 1 \end{bmatrix} \begin{bmatrix} 1 & f \\ 0 & 1 \end{bmatrix} \quad (5)$$

$$= \begin{bmatrix} 0 & f \\ -\frac{1}{f} & 0 \end{bmatrix},$$

$$A^{-1} = \begin{bmatrix} 0 & -f \\ \frac{1}{f} & 0 \end{bmatrix}.$$

Consider equation (5). A pixel on the sensor responds approximately equally to rays from all angles. Therefore its sampling kernel in ray space may be represented as a vertical line. Matrix $A^{-1}$ maps this vertical line to a horizontal line because, due to the bottom right zero matrix element, input p does not influence output p. Moreover, the spatial size of that horizontal line (the amount sampled in the spatial domain) is limited only by the microlens diameter. This large size of the sampling kernel is the reason for the low resolution of the conventional plenoptic camera.

Images are rendered from the radiance captured by the conventional plenoptic camera by integrating all angular samples at a particular spatial point. However, each spatial point is sampled by a single microlens, so rendering involves integrating all of the pixels in each microimage. As designed, rendering from the conventional plenoptic camera produces only one pixel per microlens, resulting in a rendered image with very low resolution. Even with 100,000 microlenses, the conventional plenoptic camera produces a final image of only 300×300 pixels.

The Focused Plenoptic Camera

FIG. 1 graphically illustrates the focused plenoptic camera, according to at least some embodiments. As shown in FIG. 1, the focused plenoptic camera is based on an array of microlenses focused on the image plane of the main lens. Thus, each microlens captures a portion of the image formed by the main lens. The photosensor can be thought of as being moved back, away from the main lens, so the image is formed some distance a in front of the microlenses. The microlenses serve as an array of real cameras, re-imaging parts of that image onto the photosensor.

In playing this role, each microlens forms a relay imaging system with the main camera lens. The position of each microlens satisfies the lens equation, 1/a+1/b=1/f, where a, b, and f are respectively the distance from the microlens to the main lens image plane, the distance from the microlens to the sensor, and the focal length of the microlens. In some the focused plenoptic camera, b may be set to be greater than f, and with this setting the main lens image is a virtual image formed in front of the microlenses; this is referred to as the Keplerian telescopic case. A different setting is possible, where the main lens image is a virtual image formed behind the sensor. In this case, a would be negative, and b would be less than f. This is referred to as the Galilean telescopic case. The discussion of the focused plenoptic camera provided herein generally assumes the Keplerian telescopic case, but the treatment of Galilean telescopic case would be similar.

Figure 2:
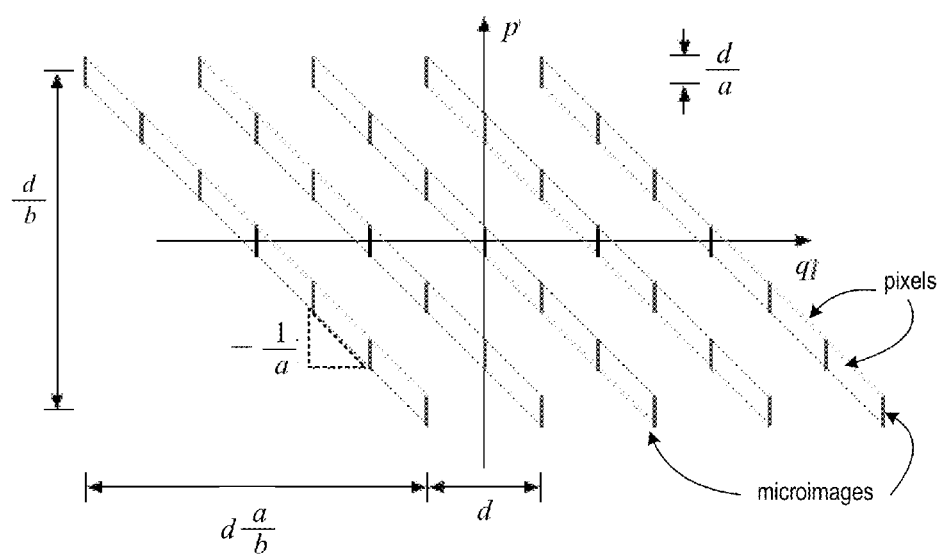
FIG. 2 illustrates sampling of the radiance r(q, p) by the microlens array of the focused plenoptic camera, represented in the two-dimensional (q, p) plane.

The focused plenoptic camera samples the radiance as shown in FIG. 2. FIG. 2 illustrates sampling of the radiance r(q, p) by the microlens array of the focused plenoptic camera, represented in the two-dimensional (q, p) plane. The microlens aperture is given by d; a and b are the spacing from the microlens plane to the image plane and from the microlens plane to the sensor, respectively. Each microlens image is a slanted stack of samples in the (q, p) plane, capturing both angular and positional distribution of the radiance at the image plane.

The total transfer matrix from the image plane to the sensor is:

$$A = \begin{bmatrix} 1 & b \\ 0 & 1 \end{bmatrix} \begin{bmatrix} 1 & 0 \\ -\frac{1}{f} & 1 \end{bmatrix} \begin{bmatrix} 1 & a \\ 0 & 1 \end{bmatrix} \quad (6)$$

$$= \begin{bmatrix} -\frac{b}{a} & 0 \\ -\frac{1}{f} & -\frac{a}{b} \end{bmatrix}.$$

The last equality holds due to focusing. Computing the inverse, $$A^{-1} = \begin{bmatrix} -\frac{a}{b} & 0 \\ \frac{1}{f} & -\frac{b}{a} \end{bmatrix}. \quad (7)$$

Figure 3:
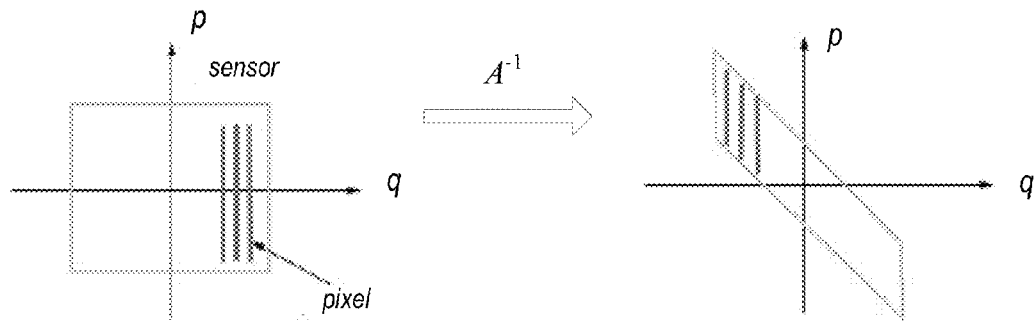
FIG. 3 illustrates a sampling pattern of one microlens in the focused plenoptic camera, according to at least some embodiments.

An important observation is that, due to the zero top right element of the matrix $A^{-1}$, the sampling kernel for each pixel remains vertical in optical phase space after inverse mapping. As a result, sampling is done by a dense set of thin vertical kernels, and is decoupled from microlens size. See FIG. 3, which illustrates a sampling pattern of one microlens in the focused plenoptic camera, according to at least some embodiments. Considering that minification for each microcamera is a/b, the high spatial resolution achieved is b/a times the sensor resolution, as shown in FIG. 2.

An important result is that the spatio-angular tradeoff for the focused plenoptic camera is not fixed by the number of microlenses. Rather, the spatio-angular tradeoffs are determined by the optical geometry (a and b). In some embodiments, to counter edge effects in the microimages, relatively large microlenses may be used.

Figure 4:
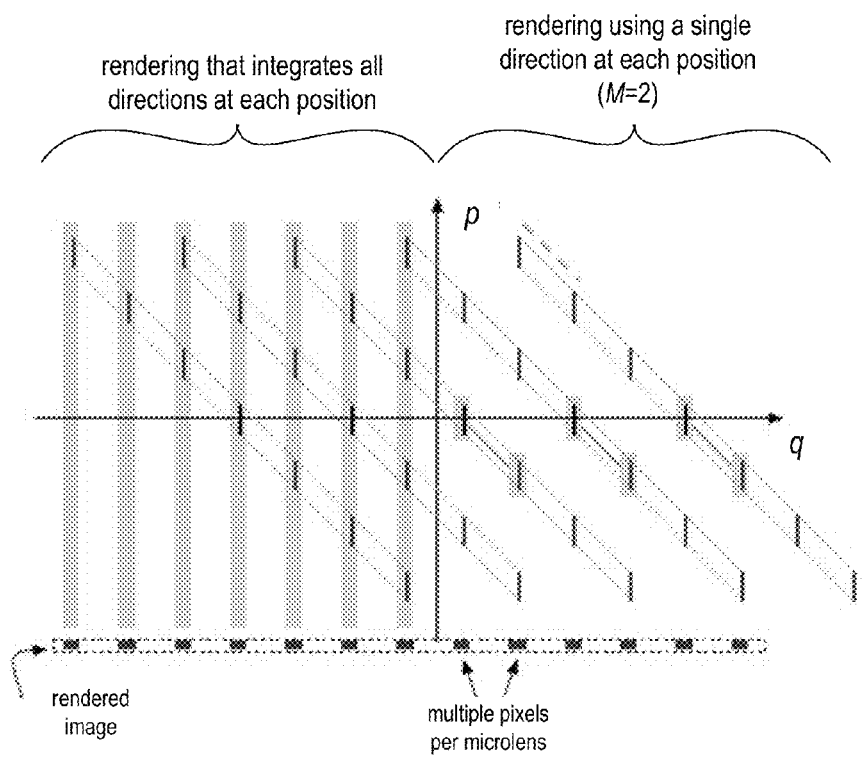
FIG. 4 graphically illustrates basic image rendering geometry with the focused plenoptic camera, according to at least some embodiments.

Images may be rendered from radiance captured with the focused plenoptic camera by integrating the angular samples at every spatial point. Unlike the conventional plenoptic camera, however, the angular samples for a given spatial point are sampled by different microlenses. Therefore, rendering with focused plenoptic camera data involves integrating across microlens images rather than within microlens images. FIG. 4 graphically illustrates image rendering geometry with the focused plenoptic camera, according to at least some embodiments. The left half of FIG. 4 shows rendering that integrates all directions associated with a given position. Note that integration takes place across microlens images. The right half of FIG. 4 shows rendering that only uses a single direction at each position. For the configuration shown, the rendered image includes two pixels from each microimage.

Rendering Methods for Focused Plenoptic Camera Data

Basic Full-Resolution Rendering

A basic focused plenoptic camera rendering process is graphically illustrated in FIG. 4 (right part). If an image is rendered with one angular sample for each location, M samples are obtained from each microlens image. In the example shown in the right half of FIG. 4, M=2 and the rendered image has twice as many pixels as there are microlenses, and thus twice the resolution of the conventional plenoptic camera. In general, the attainable resolution of a full resolution rendered image depends on the depth of the scene. The spatial resolution of a full-resolution image is b/a times the spatial resolution of the sensor. Resolution increases for image planes closer to the microlens plane (where b/a approaches unity), or, equivalently, for planes in the scene that are closer to the main lens (in the foreground). Thus, image planes in the foreground can be rendered with a higher resolution (a larger number of pixels per microlens) than image planes in the background.

In the conventional plenoptic camera, all of the directions for a given spatial sample are contained within a single microimage and all of the spatial samples for a given direction are spread across microimages. In contrast, in the focused plenoptic camera, the different views for a given spatial sample are spread across microimages.

Images may be rendered from the focused plenoptic camera according to equation (4). A single viewpoint rendering of equation (4) may be implemented by evaluating r(q, p) at some particular value of $p=p_0$, i.e., let $I(q)=r(q, p_0)$. In this case, however, it may be necessary to account for the fact that a single microimage samples over a range of q and a range of p. In particular, rather than selecting one spatial sample per microlens that corresponds to a single value of p to render the final image, at each microlens a range of spatial samples corresponding to a range of directions may be extracted (see, for example, FIG. 4, right side, where M=2).

In embodiments of a basic rendering technique, an output image corresponding to a given view (a small range of angles) can be rendered from focused plenoptic camera radiance data by selecting a contiguous set of pixels (a patch) from each microimage and tiling all such patches together into the final image. An important parameter in this process is the pixel size of the patch to select from each microimage.

Figure 5:
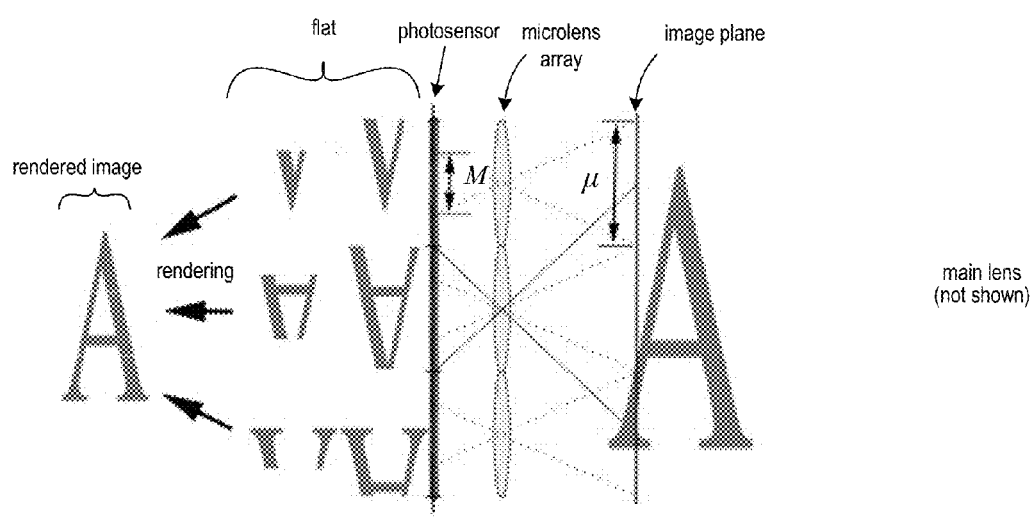
FIG. 5 graphically illustrates basic image capture and rendering geometry with the focused plenoptic camera, according to at least some embodiments.

Consider the image capture geometry illustrated in FIG. 5, where the goal is to reconstruct the image on the main lens image plane with pieces taken from each microlens image. The distance between microlenses (i.e., the pitch of the microlens array) is given by μ. The main lens image plane may be divided into μ×μ sections such that each such section maps to an M×M portion of a microlens image. The main lens image can be reconstructed by putting together those M×M portions (which may be referred to as patches). (Strictly speaking, a negative value of M is required to "flip" the patches to their correct orientation before assembling them.)

However, there is an alternative interpretation of the image capture geometry. Namely, for a given rendering pitch (the patch size M with which rendering is performed), there is an image plane at distance a in front of the microlenses that will satisfy $$\mu = M\frac{a}{b}.$$

That plane is "in focus" in the sense that an image picked up from it will be rendered with no artifacts. The patches of that exact size tile together perfectly. In other words, the rendered image is "focused" only for that plane by the choice of the pitch, i.e. the patch size M.

Example pseudocode for a basic focused plenoptic camera rendering algorithm according to at least some embodiments is given below in the section titled Full resolution rendering algorithm. Intuitively, the basic full resolution algorithm operates as follows. The pitch (defined by the number of pixels per microimage) is specified, and squares of that size are selected from each microlens image. The final image is rendered by tiling the selected squares together. Choosing one pitch or another puts different world planes "in focus." In other words, patches match each other perfectly only for one image plane behind the main lens. By the lens equation, this corresponds to a given depth in the real world. Thus, a different patch size would correspond to a different depth. In other words, the equivalent of refocusing is accomplished in the focused plenoptic camera data through the choice of the patch size (the pitch) in the full-resolution rendering algorithm. This could be called the "full resolution" rendering principle, and it is an underlying notion in focused plenoptic camera rendering methods.

Example Basic Full Resolution Rendering Algorithm

Computationally, the 4D radiance may be represented as a 4D array (or, equivalently, as a 2D array of 2D arrays). Assume each microlens image has dimension $n_x \times n_y$, and that the total number of microlens images is $N_x \times N_y$. We represent the radiance as r[i,j,k,l], a 4D array of pixels with dimension $N_x \times N_y \times n_x \times n_y$.

Figure 6:
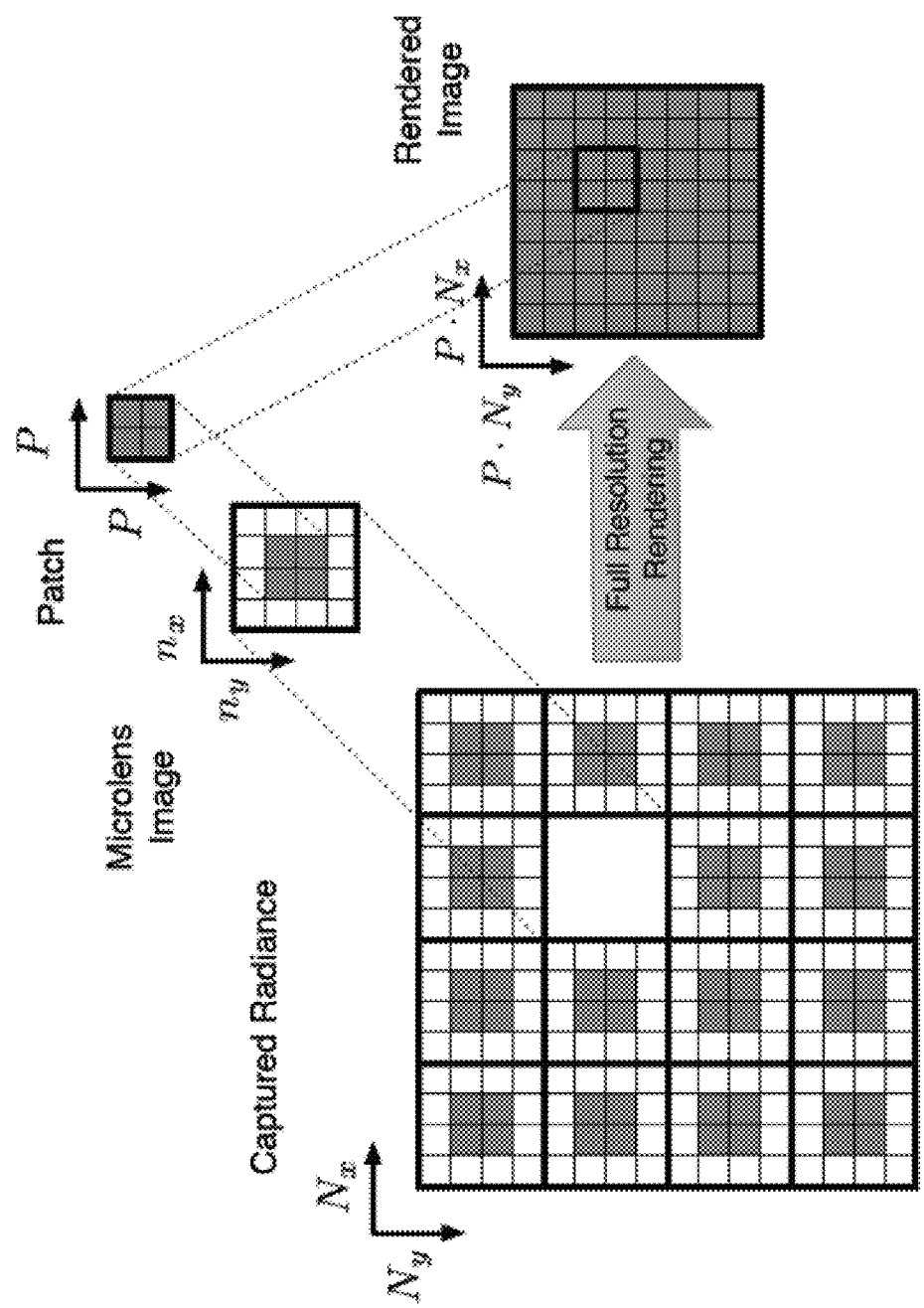
FIG. 6 graphically illustrates a basic full resolution rendering algorithm, according to at least some embodiments.

Given patch size P, pseudocode for the full resolution rendering algorithm to produce a $P^*N_x \times P^*N_y$ output image is given below. FIG. 6 graphically illustrates a basic full resolution rendering algorithm that creates a final rendered image from P×P patches of each $n_x \times n_y$ microimage. With $N_x \times N_y$ microimages in the captured radiance, the final rendered image is $P \cdot N_x \times P \cdot N_y$.

Example pseudocode for a basic full resolution rendering algorithm that may be used in at least some embodiments is given below. Note that this pseudocode is given as an example, and is not intended to be limiting. The basic full resolution rendering algorithm as implemented in the pseudocode, given discrete $N_x \times N_y \times n_x \times n_y$ radiance r[i,j,k,l], and pitch size P, outputs rendered $P^*N_x \times P^*N_y$ image I[s,t]:

For (s,t) in (P*Nx, P*Ny)

I[s,t]=r[i,j,k,l], where i=(s/Nx)*P, j=(t/Ny)*P, k=(s % Nx)*P, and l=(t % Ny)*P.

Parallel Processing Implementations

In at least some embodiments, processing and rendering plenoptic image data captured with focused plenoptic camera technology may be performed at least in part on parallel computing architectures, for example the architectures of GPU platforms, multi-core or multi-processor platforms, and so on. Using parallel processing approaches, for example GPU-based approaches, for processing and rendering plenoptic image data, embodiments of the rendering algorithms described herein may be able to achieve real-time or near-real-time performance, allowing implementations of the rendering algorithms to be interactive. With the performance provided by parallel processing, embodiments may, for example, provide user interfaces whereby a user may specify a flat captured with focused plenoptic camera technology, specify that the flat is to be rendered according to one or more values of rendering parameters such as depth of focus, and quickly view the results (i.e., in real-time or near-real time) on a display device. The user can then change the value of one or more of the parameters via the user interface and quickly view the results of the change. Thus, parallel processing implementations may provide interactive performance. Without the performance provided by parallel processing, rendering an image may take many seconds or even minutes.

A number of programming languages and tools are available for GPU programming: for example, the OpenGL Shading Language (GLSL), Cg, CUDA, and OpenCL. Whereas GLSL and Cg are aimed at rendering and related tasks in mind, CUDA and OpenCL are aimed directly at general purpose programming tasks. Any suitable GPU programming language and tools may be used to implement embodiments of the rendering algorithms described herein. However, GLSL implementations are described as examples.

In at least some embodiments, the rendering algorithms may be implemented in GLSL as OpenGL fragment shaders. Embodiments may be implemented in Python (e.g., via the PyOpenGL library, a Python interface to OpenGL), interfaces to OpenGL tend to be similar across other languages, and thus other languages may be used instead of Python. Other than providing support for creating and installing the shader, the functionality provided by OpenGL may also include, but are not limited to, reading the plenoptic image data (e.g., from a stored image), serializing the light-field data to a format suitable for OpenGL, creating a 2D OpenGL texture object for the plenoptic image data, and defining a texture in OpenGL, using the serialized image data.

Rendering the plenoptic image data may then be accomplished by rendering the installed texture, for example using an embodiment of an OpenGL fragment shader as described below.

To explain the operation of the shader, the following discusses some of the details of the optical image capture geometry, and describes elements of the basic focused plenoptic camera rendering method according to the geometry, as may be interpreted by OpenGL.

Figure 7:
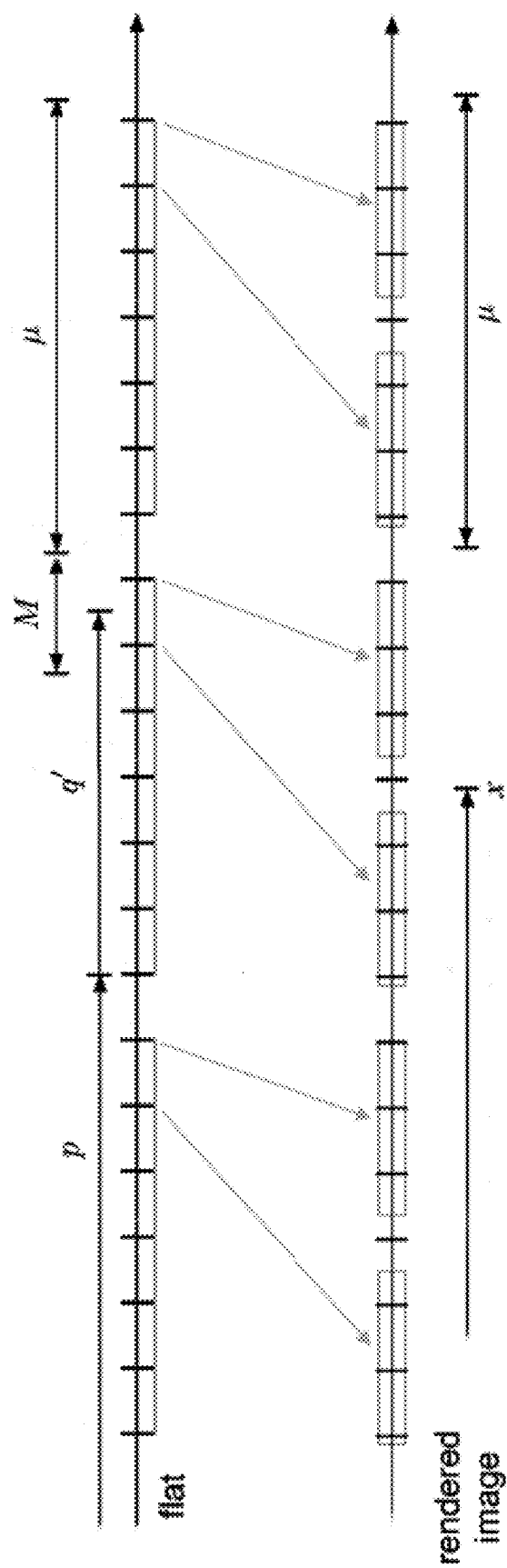
FIG. 7 graphically illustrates basic rendering directly from a plenoptic image (flat), with no blending, according to some embodiments.

FIG. 7 graphically illustrates basic rendering directly from a plenoptic image (flat), with no blending, according to some embodiments. Note that the magnification is a/b. Considering the rendering geometry shown in FIG. 7, let μ be the size of one microlens image, measured in pixels. In this example, μ=7. For a given point x in the output image, the rendering method needs to find the corresponding sampling point on the flat. To accomplish this, in at least some embodiments, the rendering method may perform two computations. First, given x, the method determines from which microlens x will be rendered. Second, the method determines where in the region of size M the point x lies.

In at least some embodiments, to compute which microlens corresponds to x, the rendering method takes the integer part of x divided by μ, which gives the index of the microlens. In other words, this number (which may be referred to asp) is given by:

$$p = \left\lfloor \frac{x}{\mu} \right\rfloor. \quad (C1)$$

The pixel location of the beginning of that microlens in the flat is then given by multiplying the microlens number by the size of one microlens image, i.e., pµ.

In at least some embodiments, the rendering method then computes the offset within the region of size M corresponding to x. In at least some embodiments, to do this, the method computes the difference between x and the start of microlens (p). This gives the offset in the rendered image; however, the offset in the flat is needed. Since a region of size M in the flat is scaled to a region of size µ in the final image, the offset needs to be scaled by $$\frac{M}{\mu}.$$

That is, the offset q is given by:

$$q = \left(x - \left\lfloor \frac{x}{\mu} \right\rfloor \mu\right)\frac{M}{\mu} \quad (C2)$$

$$= \left(\frac{x}{\mu} - p\right)M.$$

In at least some embodiments, after the above computations, an adjustment is made. The center of the M×M region of the flat needs to render to the center of the corresponding region of the final image. The equations above will map the left edge of the microlens image to the left edge of the corresponding region in the rendered image. To accomplish this centering, an offset of $$\frac{\mu - M}{2}$$

is added to q:

$$q' = q + \frac{\mu - M}{2} \quad (C3)$$

$$= \left(\frac{x}{\mu} - p\right)M + \frac{\mu - M}{2}.$$

Combining equations (C1) and (C3), the corresponding point in the flat for a given point x in the output image is given by f(x) where:

$$f(x) = p\mu + q'. \quad (C4)$$

Example GLSL fragment shader code that may implement the basic rendering algorithm described above and that may be used in at least some embodiments is given below. Note that this code renders one point in the output image, and may be performed in parallel to render multiple points in the output image simultaneously. Note that this code is given as an example, and is not intended to be limiting. Comments are preceded by double slashes (//).

```
// input or global parameters
uniform sampler2DRect flat;    // the plenoptic image
uniform float M, mu;           // M is the size of a patch;
                               // mu is µ, the size of one microlens
                               // image in pixels
uniform float XOffset;         // x and y offsets or shifts for the
                               // patches from center
uniform float YOffset;         // of microimages; may be user-provided
void main( )
{
    // x/µ ; x is the point on the screen that is to be rendered
    vec2 x_mu = gl_TexCoord[0].st/mu;
    // p = ⌊x/µ⌋; p is the index of the microlens from which x will be
    rendered
    vec2 p= floor(x_mu);
    // q = (x/µ – p)M ; calculates the offset q in a patch of size M
    vec2 q = (x_mu – p) * M;
    // q' = q + (µ – M)/2 ; centers the offset q in the patch of size M
    vec2 qp = q + 0.5*(mu – M);
    // calculate shift for the patch in the microimage
    vec2 offset = vec2(XOffset,YOffset)*(mu – M);
    // f(x)= pµ + q' + x and y offsets; calculates the position from which the
    flat will
    // be sampled, adjusted by the x and y offsets
    vec2 fx = p * mu + qp + offset;
    // read the value from the calculated position fx of the input flat and
    // assign it to the respective point in the output image
    gl_FragColor = texture2DRect(flat, fx);
}
```

In the above example GLSL code, the plenoptic image, as well as the values for µ and M, are provided by the user program via uniform variables. The shader program computes q, q', and f(x) as q, qp, and fx, respectively. Changing the viewpoint of a synthesized image is enabled by adding offsets XOffset and YOffset (both equal to 0 by default) to the coordinates fx; in at least some embodiments, XOffset and YOffset may be user-specified. Finally, the value of the pixel is looked up in the flat, and that value is assigned to the requested fragment color.

Artifacts in Basic Full Resolution Rendering

Figure 8:
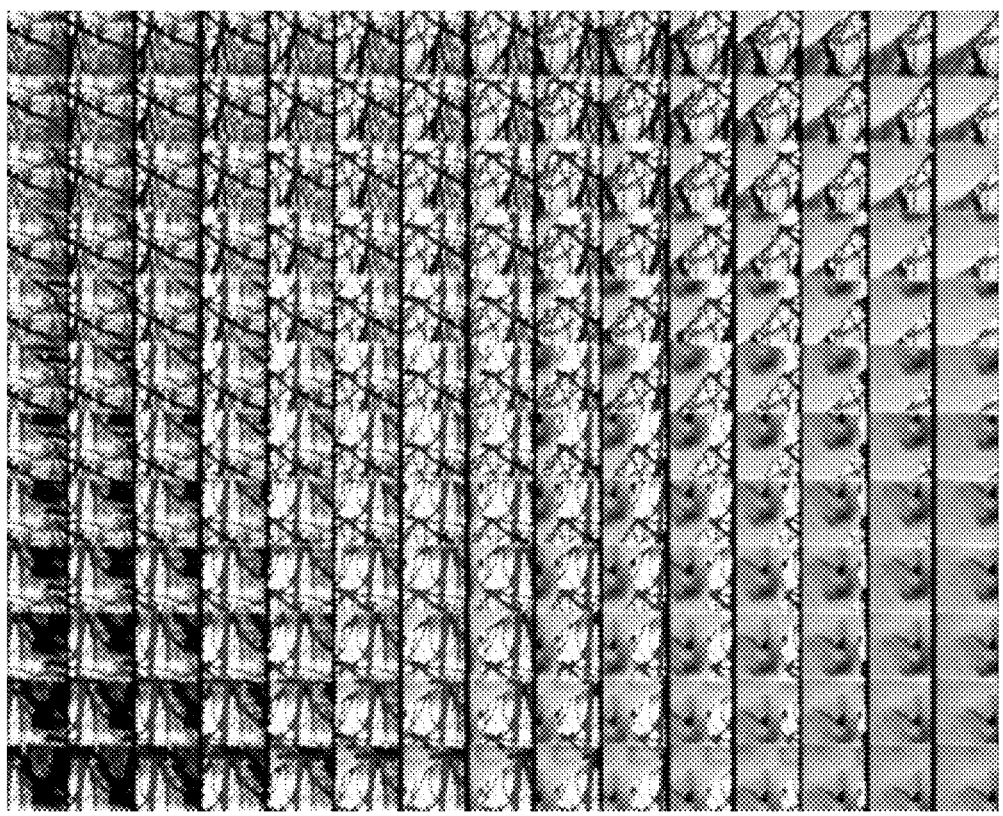
FIG. 8 shows a small crop from input radiance data (i.e. a flat) captured with a focused plenoptic camera that is used for illustrating examples of rendering.
Figure 9:
FIG. 9 shows an example image rendered from the radiance data illustrated in FIG. 8 using the basic full resolution rendering algorithm.

FIG. 8 shows a small crop from input radiance data (i.e. a flat) captured with a focused plenoptic camera that is used for illustrating examples of rendering. FIG. 9 shows an image rendered from the radiance data illustrated in FIG. 8 using the basic full resolution rendering algorithm described above. The basic full resolution rendering process can produce artifacts, as can be seen in the background in FIG. 9. These artifacts result because the pitch necessary to produce artifact-free full resolution rendering is dependent on the depth in the scene. That is, different parts of a scene typically would require different patch sizes to be properly rendered. However, the basic full resolution rendering algorithm uses a global, fixed patch size. The pitch is too large for the background in FIG. 9, resulting in the visible artifacts.

Figure 10:
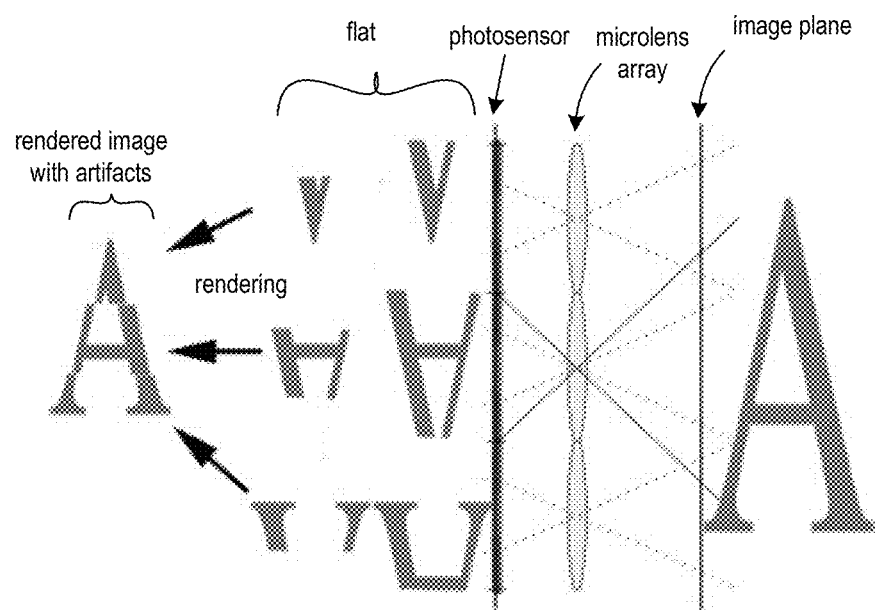
FIGS. 10 and 11 graphically illustrate artifacts that occur when the choice of M is respectively too small or too large for rendering a part of a scene.
Figure 11:
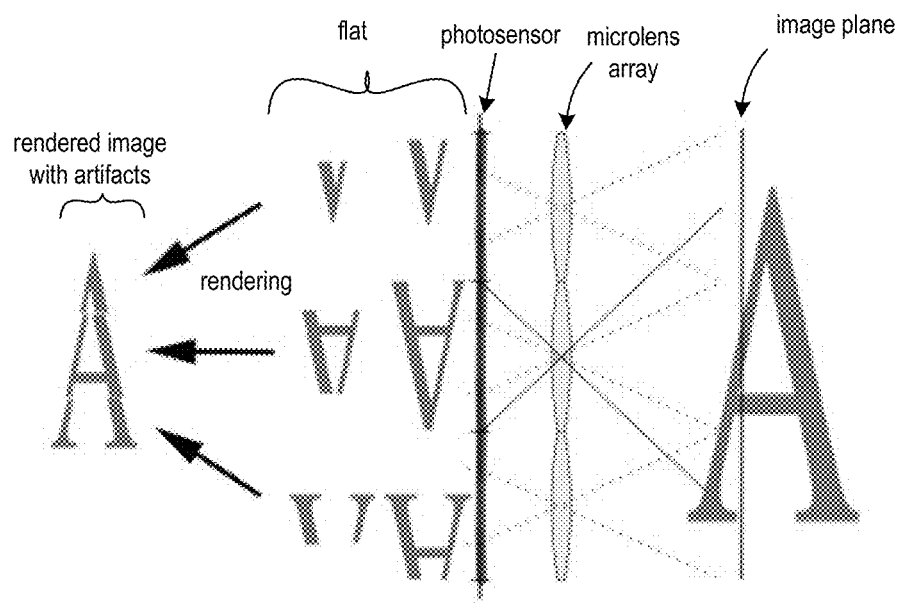

The relationship between focusing and patch size also explains the artifacts that can arise when rendering a scene that has different depths. In particular, if a fixed patch size is used for a scene that has differing depths, there will be parts of the scene where the patch size is not the correct one to bring that part of the scene into focus. In those parts of the scene, the patches will not match at their boundaries. Unless that region of the scene is relatively smooth and uniform, artifacts at the microimage boundaries will be apparent. FIGS. 10 and 11 graphically illustrate artifacts that occur when the choice of M is respectively too small or too large for rendering a part of a scene. In FIG. 10, the chosen pitch is too small for the scene being rendered, resulting in pixilation artifacts. In FIG. 11, the chosen pitch is too large for the scene being rendered, resulting in "screen door" artifacts.

These artifacts are indications that the basic full resolution rendering approach described above is not well-matched to the particular task of rendering focused plenoptic data. Modifying the approach to produce artifact-free images depends on the particular task to be accomplished. The following describes approaches to reducing artifacts in images rendered from focused plenoptic camera data. These approaches are referred to as depth-based rendering and rendering with blending, or blended rendering.

Depth-Based Rendering

Embodiments of a depth-based rendering technique for focused plenoptic camera data are described. In the depth-based rendering technique, depth information from the scene is leveraged so that different (and correct) patch sizes can be used for rendering different parts of the scene. Embodiments of the depth-based rendering technique extract the depth information of a scene directly from a plenoptic image, and then apply this depth information to render an artifact-free image. Note that objects in the scene farther from the camera are at greater depth, while objects closer to the camera are at lesser depth. In the depth-based rendering technique, smaller patch sizes are used for portions of the scene that are estimated to be at greater depth, and larger patch sizes are used for portions of the scene that are estimated to be at lesser depth.

In embodiments of the depth-based rendering technique, to determine the correct patch sizes across an image of a scene, a property of the focused plenoptic data may be leveraged. This property is that the microimages capture overlapping regions of the scene. The patch size also determines the spacing between patches; the correct patch size for focusing a region of a scene will also be the spacing at which neighboring microimages overlap. That is, the same portion of the scene that is captured by different microlenses needs to be rendered to the same position in the output image. This matching condition leads to the following two-pass algorithm for rendering:

For each microlens (and thus for the respective microimages in the flat), determine the patch size that results in the best match with all of its neighbors.

Render the final image with the saved pitch value for each microlens.

Determining the minification that provides the best match between two microlens images is essentially an image registration problem. Embodiments may exploit several aspects of focused plenoptic camera technology to streamline this process. First, the microimages in the captured radiance may be precisely determined by the microlens geometry, and may be precisely aligned. Thus, the difference between neighboring microimages along the horizontal and vertical axes of the microlens array may only be horizontal and vertical translations, respectively. Moreover, based on the optical design of the focused plenoptic camera, there are bounds on how large the shift between microlens images can be. In at least some embodiments, these characteristics of the captured radiance may be used to simplify a depth estimation algorithm.

In at least some embodiments, the depth estimation algorithm produces an array of patch size values that are subsequently used in rendering the final image; this array may be referred to as a depth array or depth mask. To render the final image, the basic full resolution rendering algorithm is modified so that, rather than using a fixed pitch value, the precomputed value for a given microlens is looked up in the depth array.

Figure 13:
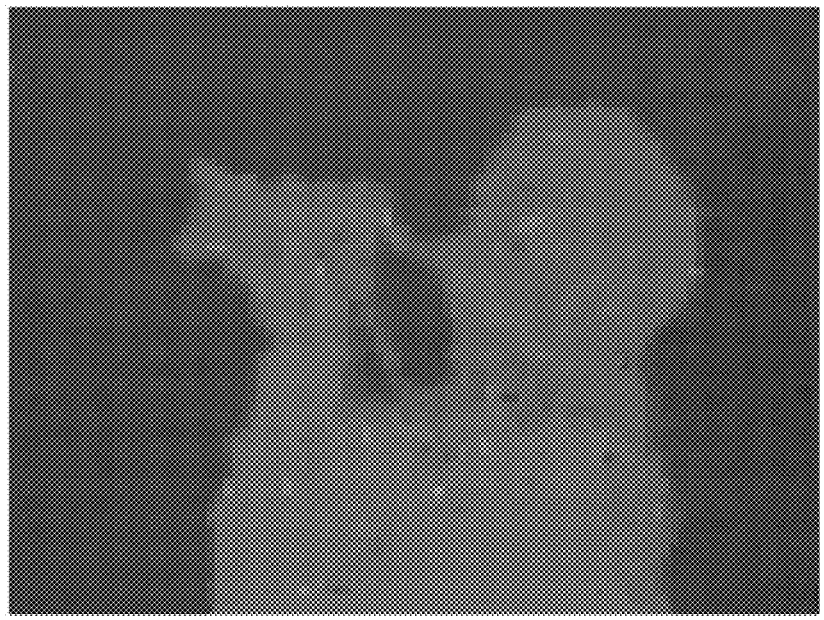
FIG. 13 graphically illustrates an example of estimated depth used for the rendered image shown in FIG. 12.
Figure 14:
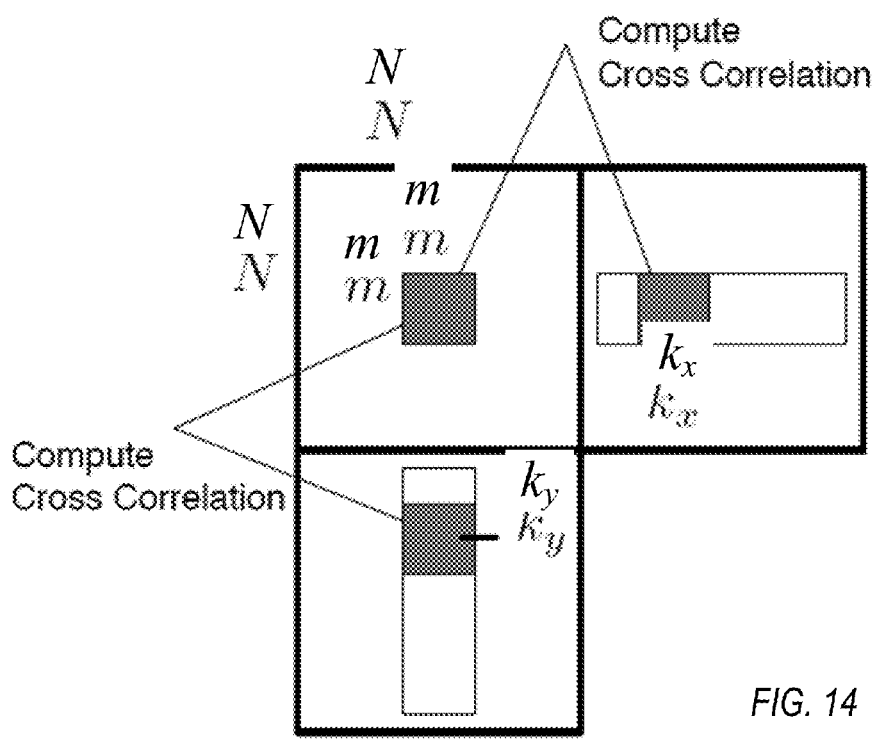
FIG. 14 graphically illustrates an embodiment of a depth estimation algorithm that may be used in at least some embodiments.

Example pseudocode for a depth estimation algorithm that may be used in at least some embodiments is given in the section titled Depth Estimation. FIG. 14 graphically illustrates an embodiment of a depth estimation algorithm that may be used in at least some embodiments. FIG. 13 graphically illustrates an example of estimated depth used for the rendered image shown in FIG. 12. The lighter regions in FIG. 13 correspond to foreground, and thus to larger pitch values. The darker regions correspond to background, and thus to smaller pitch values.

Figure 12:
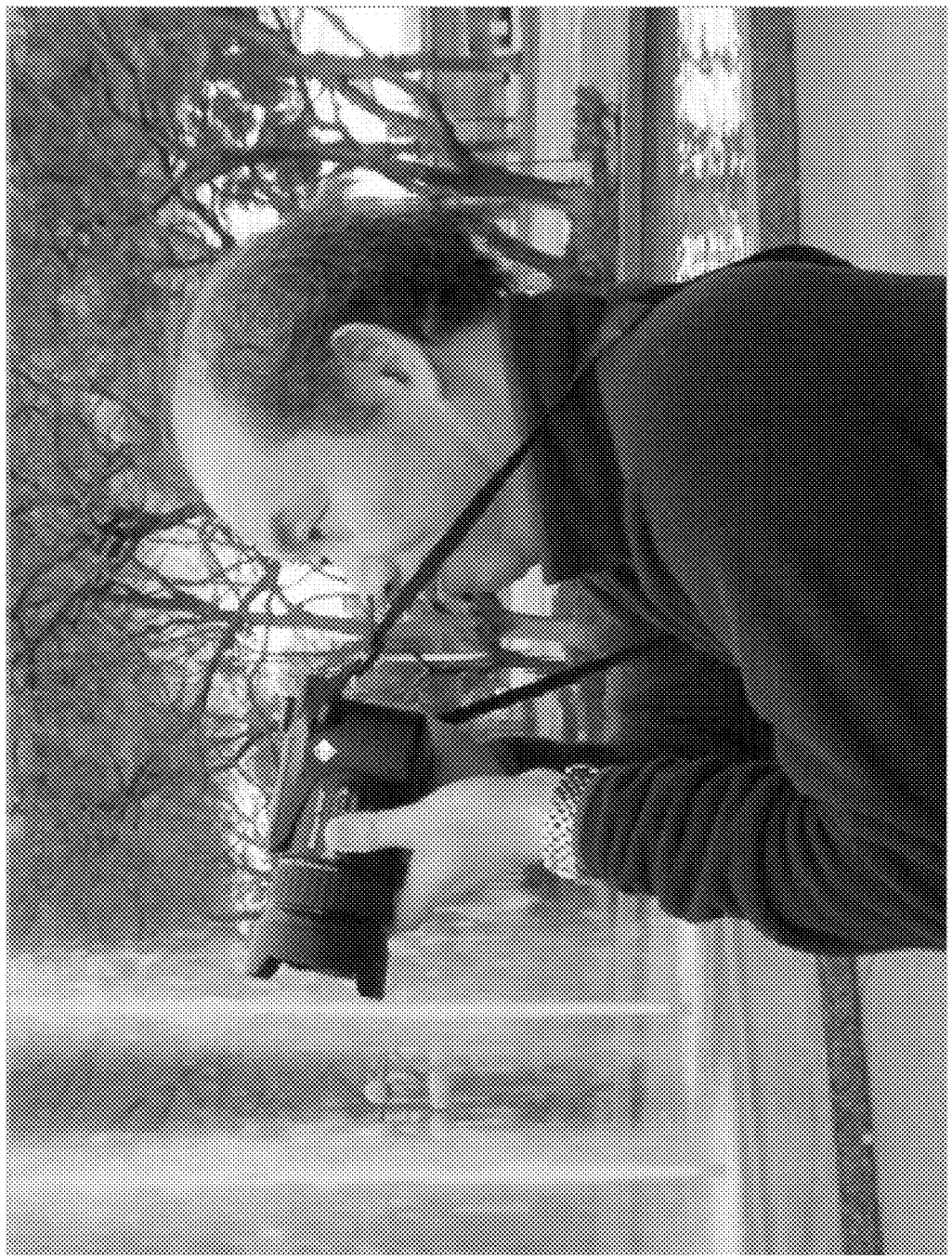
FIG. 12 shows an example image rendered using a depth-based rendering algorithm, according to at least some embodiments.

FIG. 12 shows an example image rendered using a depth-based rendering algorithm, according to at least some embodiments. By extracting depth information as described above and then rendering the image with different magnification at each microlens, the image in FIG. 12 may be rendered from the radiance data illustrated in FIG. 9, according to the depth estimation illustrated in FIG. 13. Note that regions of the image in FIG. 12 at all depths are rendered essentially artifact-free when compared to the rendered image in FIG. 9, and that the image in FIG. 12 appears to be in focus at essentially all depths.

Depth Estimation

An algorithm for estimating depth (referred to as a depth estimation algorithm) that may be used in at least some embodiments is given below. The operation of the depth estimation algorithm is illustrated graphically in FIG. 14. The depth estimation algorithm produces an array of pitch values that may subsequently be used in rendering the final image. Note that the depth estimation algorithm is given as example pseudocode, and is not intended to be limiting.

For each N×N microlens image:

Select an m×m window from the center of that microlens image.

For k=−N+m/2 to k=N−m/2:

Compute the cross-correlation between the m×m window and a corresponding window centered at $k_x$ in the neighboring microlens image along the x axis and record the value of $k_x$ with the best correlation.

Compute the cross-correlation between the m×m window and a corresponding window centered at $k_y$ in the neighboring microlens image along the y axis and record the value of $k_y$ with the best correlation.

Record a value k equal to average of $k_x$ on the left and right boundaries and $k_y$ on the top and bottom boundaries Return the array of recorded values of k.

Example Depth-Based Rendering Algorithm

In at least some embodiments, to render the final image using depth information, the basic rendering algorithm that was previously described may be modified so that, rather than using a fixed pitch value, the value for the given microlens is looked up in the pitch array. In at least some embodiments, the depth-based rendering algorithm may be performed at least in part on parallel computing architectures, for example the architectures of GPU platforms, multi-core or multi-processor platforms, and so on. An example GLSL implementation of the depth-based rendering algorithm that may be used in at least some embodiments is given below. Note that this code renders one point in the output image, and may be performed in parallel to render multiple points in the output image simultaneously. Note that this code is given as an example, and is not intended to be limiting. Any suitable GPU programming language and tools may be used to implement embodiments of the depth-based rendering algorithm. Comments are preceded by double slashes (//).

```
// input or global parameters
uniform sampler2DRect Flat;              // the plenoptic image
uniform sampler2DRect DepthMask;         // depth input, e.g. generated
                                         // according to the depth estimation
                                         // algorithm previously described
uniform float MicroimageSize;            // μ, the size of one microlens image
                                         // (microimage), in pixels
uniform vec2 Offset;                     // vector indicating the x and y offsets
                                         // or shifts for the patches from center
void main( )
{
    // Calculate the offset or shift for the patch in the microimage
    vec2 offset = Offset*MicroimageSize;
    // Calculate M2, the size of the patch for this microimage. This reads a value
    // (between 0 and 1) from the DepthMask at gl_TexCoord[0].st + offset. The
    // value is read from the red channel, as indicated by the ".r", as that is the channel
    // in DepthMask that is used to store the depth values; however, other methods for
    // storing and reading the depth values may be used. The value -25.6 is an
    // implementation-dependent scaling value.
    float M2 = -25.6*(texture2DRect(DepthMask, gl_TexCoord[0].st + offset).r);
    // p = ⌊x/μ⌋; x is the point on the screen that is to be rendered; p is the index of
    // the microlens from which x will be rendered
    vec2 p= floor(gl_TexCoord[0].st / MicroimageSize);
    // Calculate and center the offset q in the patch (q' = q + (μ - M)/2)
    // q is calculated by (gl_TexCoord[0].st / MicroimageSize - p) * M2; Qp is q'.
    // M2, the calculated size of the patch for this microimage based on the estimated
    // depth for this microimage, is used for M instead of a global patch size.
    vec2 Qp = (gl_TexCoord[0].st / MicroimageSize - p) * M2 +
    0.5*(MicroimageSize - M2);
    // Apply the shift to the calculated position in the patch; R is the calculated
    // position in the patch including all corrections.
    vec2 R = Qp + offset;
    // calculate the position from which the flat will be sampled
    // vPosXY = p (microlens index) * the microimage size, plus the corrected
    // position R in the patch.
    vec2 vPosXY = p * MicroimageSize + R;
    // read the value from the calculated position vPosXY of the input flat
    vec4 colXY = texture2DRect(Flat, vPosXY);
    // assign the value of colXY to gl_FragColor, i.e. to the point in the output image
    gl_FragColor = colXY;
}
```

Flowcharts for the Depth-Based Rendering Technique

Figure 15A:
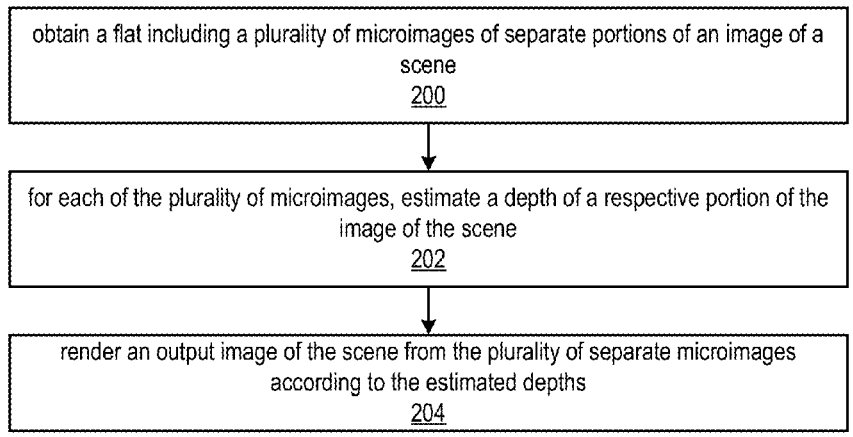
FIG. 15A is a high-level flowchart of a method for depth based rendering, according to at least some embodiments.
Figure 15B:
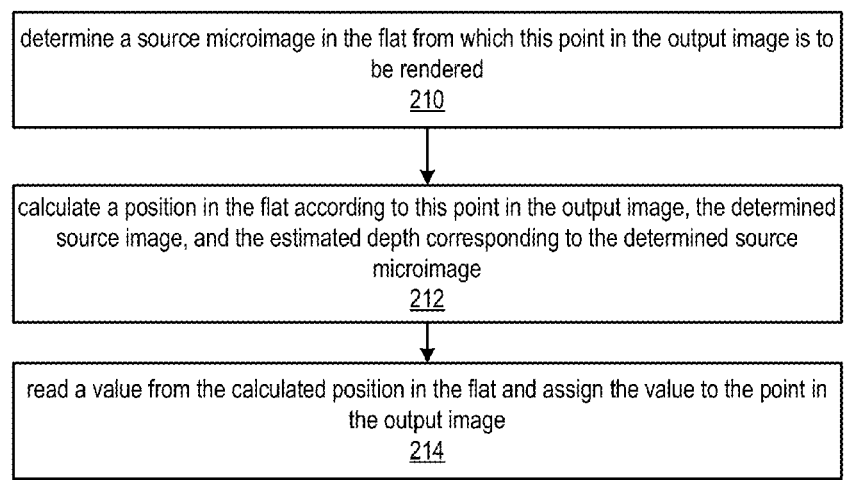
FIG. 15B is a flowchart of a method for rendering a point in an output image, according to at least some embodiments of the depth-based rendering technique.

FIGS. 15A and 15B are flowcharts of a depth-based rendering technique, according to at least some embodiments. FIG. 15A is a high-level flowchart of a method for depth based rendering, according to at least some embodiments. As indicated at 200, a flat including a plurality of microimages of separate portions of an image of a scene is obtained. Each of the plurality of microimages is in a separate region of the flat. The flat is a two-dimensional (2D) representation of a four-dimensional (4D) light-field that captures both spatial and angular information of the scene, captured according to focused plenoptic camera technology.

As indicated at 202, for each of the plurality of microimages, a depth of a respective portion of the image of the scene is estimated. An example method for estimating depth is given above in the section titled Depth estimation. In some embodiments, to estimate depth for a given microimage, the method computes cross-correlation between a window in the given microimage and a corresponding window centered at multiple positions in two or more neighboring microimages to determine best correlation values. The method then estimates the depth for the given microimage according to the determined best correlation values for the given microimage with the two or more neighboring microimages.

As indicated at 204, the method renders an output image of the scene from the plurality of separate microimages according to the estimated depths. To render the output image, the method given in FIG. 15A may separately determine a value for each point of the output image from the flat.

FIG. 15B is a flowchart of a method for rendering a given point in an output image, according to at least some embodiments of the depth-based rendering technique. As indicated at 210, a source microimage in the flat from which this point in the output image is to be rendered is determined. As indicated at 212, a position in the flat is determined according to this point in the output image, the determined source image, and the estimated depth corresponding to the determined source microimage. As indicated at 214, a value is read from the calculated position in the flat and assigned to the point in the output image. The section above titled Example depth-based rendering algorithm gives an example implementation of the method of FIG. 15B.

In at least some embodiments, the methods of FIGS. 15A and 15B perform the depth-based rendering technique according to parallel processing technology that renders multiple points of the output image in parallel. In at least some embodiments, the parallel processing technology is graphical processing unit (GPU) technology.

Rendering with Blending

Figure 16A:
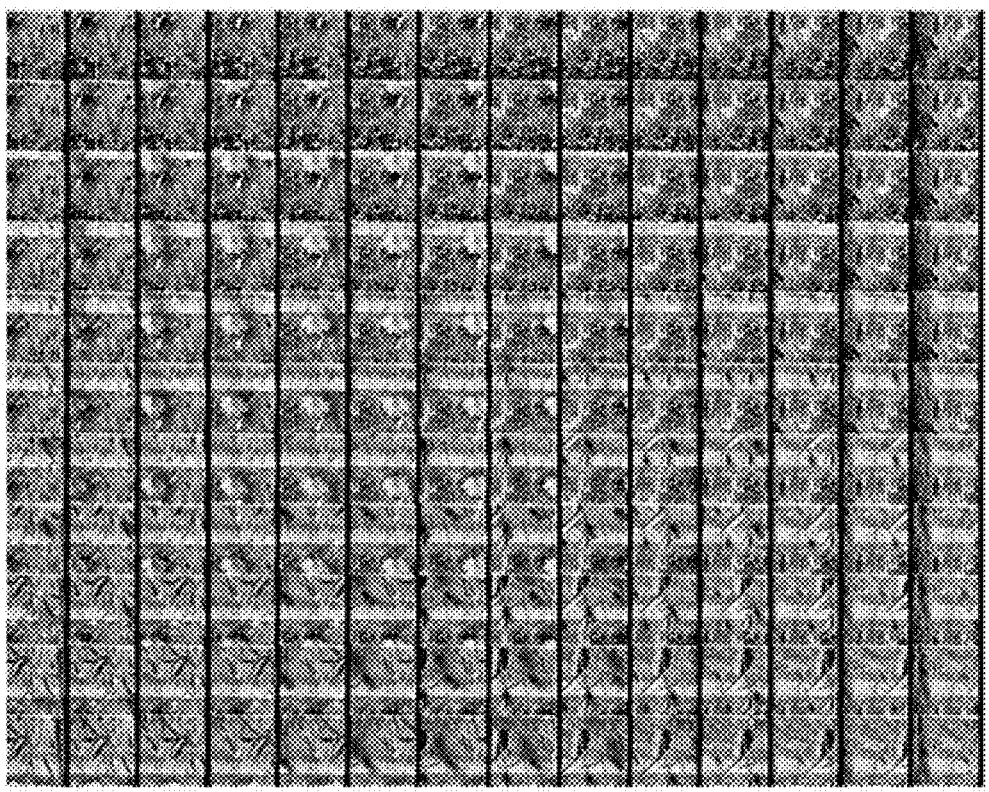
FIG. 16A shows a small crop from a raw image (flat) captured with a focused plenoptic camera.
Figure 16B:
FIG. 16B shows an image rendered from the flat of FIG. 16A using the basic full resolution rendering algorithm.
Figure 16C:
FIG. 16C shows an image rendered using a rendering with blending technique.

Embodiments of a rendering with blending technique for focused plenoptic camera data are described. Rendering for finite size apertures involves integration in the angular dimensions. Intuitively, this integration process means that the same spatial point must be averaged together (blended) across different microlens images (see, e.g., FIG. 4, left portion). A direct comparison of basic full resolution rendering and rendering with blending is shown in FIGS. 16B and 16C. FIG. 16A shows a small crop from a raw image (flat) captured with a focused plenoptic camera. FIG. 16B shows an image rendered from the flat of FIG. 16A using the basic full resolution rendering algorithm. Note the presence of artifacts due to non-matching patches at large depth. FIG. 16C shows an image rendered using a rendering with blending technique. Note that the artifacts are now suppressed, and that the out-of-focus regions (the background, in this example) appear properly blurred. Note the reduction of artifacts and the effect of "focusing" on the foreground with blurred background in the blended rendering version of the image shown in FIG. 16C.

Although the depth-based rendering technique as previously described enables artifact-free rendering of a single view of the scene when compared to rendering using a basic full resolution rendering as previously described, the result is an "all in-focus" image which precludes depth-of-field and refocusing effects (see, for example, FIG. 12). Obtaining these effects may require combining multiple views of a scene, that is, integrating over a range of views as specified in equation (4):

$$I(q) = \int_p r(q,p) dp.$$

To accomplish the integration over p in equation (4) for the focused plenoptic camera, the same spatial point may be averaged together (blended) across microlens images. (Averaging across microlens images is in contrast to the conventional plenoptic camera that averages within microlens images). For microlenses spaced µ apart and a patch size of M, the pixels that need to be averaged together for a given output pixel will be separated by distance (µ–M) in the captured raw image.

From the phase space diagram of the rendering process (FIG. 4), it can be seen that for small mismatches of the slope of the integration direction, blending should be sufficient to produce a smooth blur. (Note that the slope is vertical in FIG. 4, but since different depths are related by shear in ray space, in general slope is non-vertical, and is defined by M). For larger mismatches, there may not be enough views, and ghost-like artifacts may be seen due to features being repeated across multiple patches.

Figure 17A:
FIG. 17A shows an image rendered using the rendering with blending algorithm with a small pitch (e.g., 7 pixels).
Figure 17B:
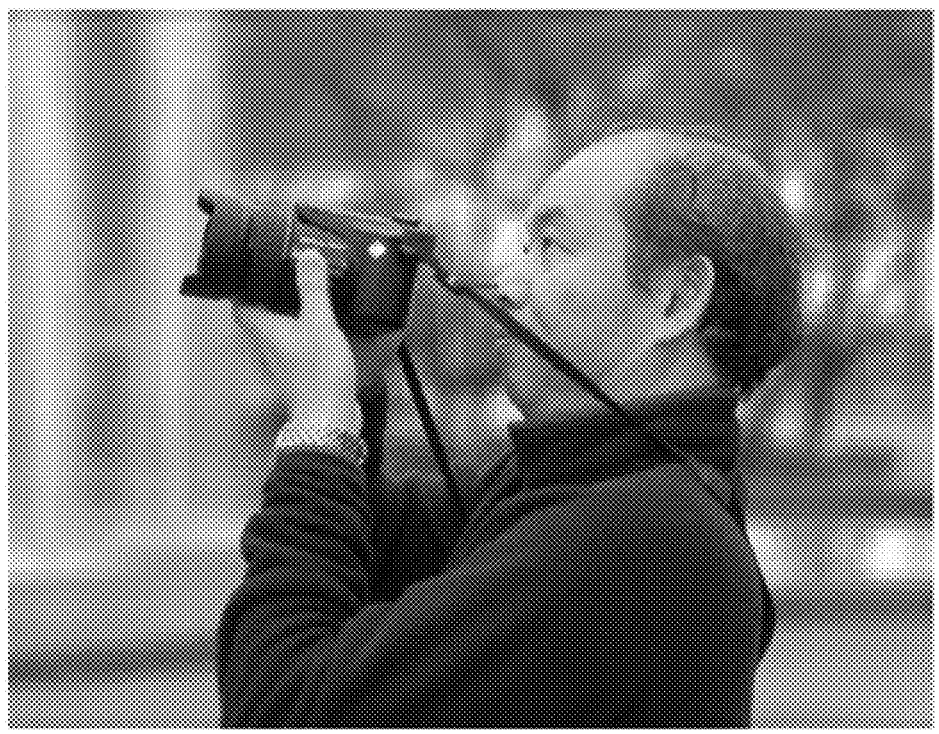
FIG. 17B shows an image rendered using the rendering with blending algorithm with a larger pitch (e.g., 10 pixels).

A comparison of two rendering with blending results is shown in FIGS. 17A and 17B. FIG. 17A shows an image rendered using the rendering with blending algorithm with a small pitch (e.g., 7 pixels). Note that, in FIG. 17A, the background is in focus, and the foreground is out of focus. FIG. 17B shows an image rendered using the rendering with blending algorithm with a larger pitch (e.g., 10 pixels). Note that, in FIG. 17B, the background is out of focus, and the foreground is in focus.

Focusing

An important characteristic of plenoptic data captured with focused plenoptic camera technology is that refocusing may be accomplished through choice of the pitch size in the rendering algorithm. The pitch is related to shear in ray space. Conversely, the value of the pitch determines the plane (the depth) in the image that is in focus. Images captured with the focused plenoptic camera can therefore be used to generate differently focused rendered images by choosing different values of the pitch size. When multiple microlens images are integrated (blended) according to the rendering with blending technique, the out-of-focus regions appear blurred, as would be expected. Because the microlenses have a very small aperture, there is a significant depth of field, i.e., portions of the scene that are in focus for a given value of the pitch size will extend for a large depth.

Example Rendering with Blending Algorithm

To realize the integration over p in equation (4), i.e., over multiple views, the same spatial point may be averaged together (blended) across microlens images. For microlenses spaced µ apart and a patch size of M, the pixels that need to be averaged together to render a given pixel in the rendered image will be distance (µ–M) apart.

That is, all pixels at position f(x) are averaged, where:

$$f_i(x) = p_i + q' \quad (F1)$$

where $$p_i = \left\lfloor \frac{x}{\mu} \right\rfloor + i(\mu - M) \quad (F2)$$

for i = ..., −2, −1, 0, 1, 2, ... and q' is given by equation (C3):

$$q' = q + \frac{\mu - M}{2} \quad (C3)$$

$$= \left(\frac{x}{\mu} - p\right)M + \frac{\mu - M}{2}.$$

Since µ is constant, this means that for images generated with a given sampling pitch M there is a fixed upper bound, Um, for the absolute value of i, namely $$\lim = \left(\frac{\left\lfloor \frac{\mu}{M} \right\rfloor - 1}{2}\right) \quad (F3)$$

In addition, in at least some embodiments the contribution from different views may be weighted to perform weighted blending. To accomplish weighted blending within GLSL implementations, another texture (single-component, in this case) may be as a lookup table to specify the weight of each pixel in the microlens as a function of position. If fragment coordinates fall outside the weight mask, then the texture wrapping mode would determine what happens with the lookup. This situation occurs when the weight mask is smaller than one microlens image, or when the chosen lim value is larger than the one obtained from equation (F3). In some embodiments, a µ×µ Gaussian, or squared Gaussian mask with GL CLAMP set as the wrapping mode, may be used. Also, note that when using Gaussian-like masks, an alternative method for changing the viewpoint of the synthesized image is by adding an offset vector to the weight coordinates. If using varying weights, the method needs to keep track of the net weight so that the output color components can be normalized.

In at least some embodiments, the rendering with blending algorithm may be performed at least in part on parallel computing architectures, for example the architectures of GPU platforms, multi-core or multi-processor platforms, and so on. An example GLSL fragment shader code that may implement the rendering with blending algorithm that be used in at least some embodiments is given below. Note that this code renders one point in the output image, and may be performed in parallel to render multiple points in the output image simultaneously. Note that this code is given as an example, and is not intended to be limiting. Any suitable GPU programming language and tools may be used to implement embodiments of the algorithm. Comments are preceded by double slashes (//).

```
// input or global parameters
uniform sampler2DRect weight,    // lookup table that specifies the weight of
                                 // each pixel in the microlens as a function
                                 // of position
               flat;             // the plenoptic image
uniform float M, mu;             // M is the size of a patch; mu is μ, the size
                                 // of one microlens image in pixels
uniform int lim;                 // fixed upper bound for the absolute value
                                 // of i; see equation F3.
void main( )
{
    // p = ⌊x/μ⌋; x is the point on the screen that is to be rendered; p is the index of
    // the microlens (i.e., microimage) from which x will be rendered (in this case, x
    // is blended from the values of multiple microimages in the neighborhood of p)
    vec2 p= floor(gl_TexCoord[0].st / mu);
    // Calculate and center the offset q in the patch (q' = q + (μ − M)/2)
    // q is calculated by (gl_TexCoord[0].st / mu − p) * M; qp is q'.
    vec2 qp = (gl_TexCoord[0].st / mu − p) * M + 0.5*(mu − M);
    // initialize a color and a total weight variable
    vec4 colXY = vec4(0.0);
    float total_weight = 0.0;
    // loop through the microimages from which pixels are to be sampled and
    // blended; for example, if lim = 1, a 3×3 square containing nine microimages
    // will be sampled.
    for (int i= −lim; i <= lim; ++i) {
        for (int j= −lim; j <= lim; ++j) {
            // form a vector from the current values of loop indexes i and j
            vec2 ij = vec2(float(i), float(j));
            // compute the position from which the weight will be obtained
            vec2 dq = qp − ij * M;
            // get the weight for this position
            float weight = texture2DRect(weight, dq).r;
            // compute the position from which the flat will be sampled
            vec2 vPosXY = (p + ij)*mu + dq;
            // read the value from position vPosXY of the flat, adjust the value
            // according to the weight, and add the adjusted value to colXY
            colXY += texture2DRect(flat, vPosXY); * weight;
            // accumulate the weight in total weight
            total weight += weight;
        }
    }
    // normalize the value of colXY by dividing by the accumulated weigh value and
    // assign the normalized value to gl_FragColor
    gl_FragColor = colXY / total_weight;
}
```

Note that, in some embodiments, instead of accumulating the weights and normalizing the accumulated value according to the accumulated weights as described above, the accumulated value may be normalized in other ways, or may simply be averaged by dividing the accumulated value by the total number of microimages that were sampled rather than the accumulated weight.

Flowcharts for the Depth-Based Rendering Technique

Figure 18A:
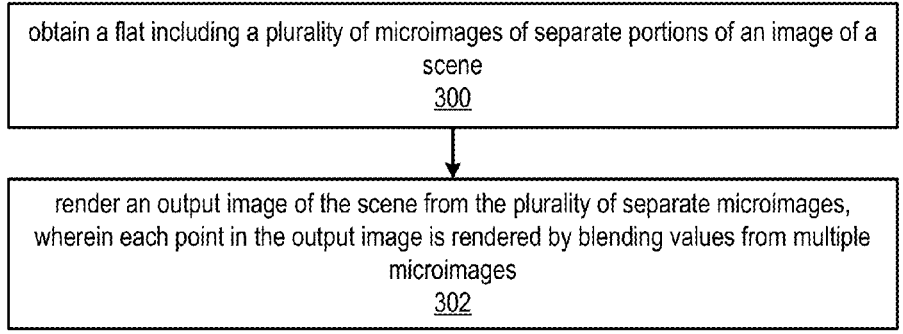
FIG. 18 is a high-level flowchart of a method for rendering with blending, according to at least some embodiments.
FIG. 18B is a flowchart of a method for rendering a given point in an output image, according to at least some embodiments of the rendering with blending technique.
Figure 18B:
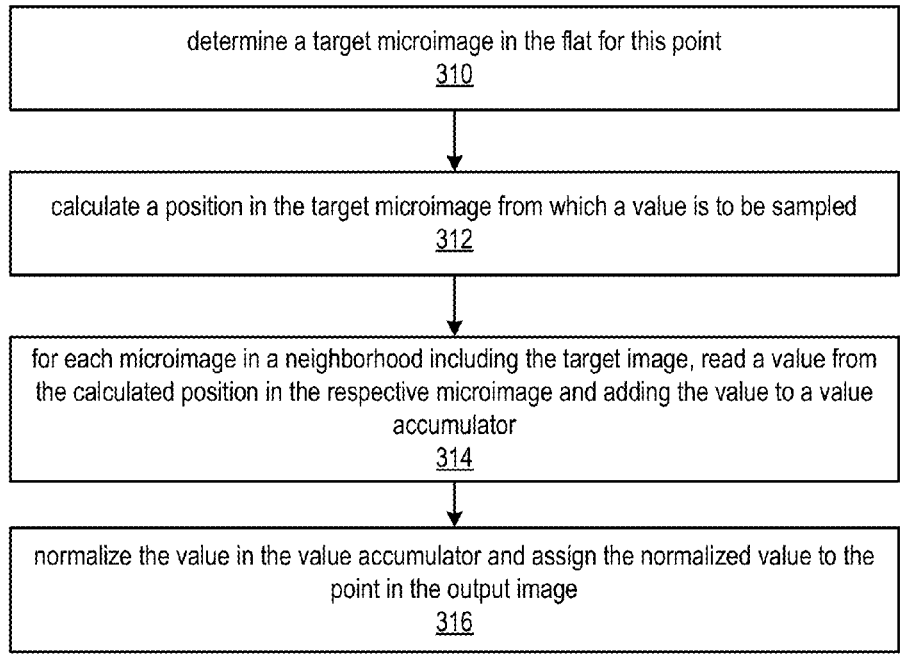

FIGS. 18A and 18B are flowcharts of a rendering with blending technique, according to at least some embodiments. FIG. 18A is a high-level flowchart of a method for rendering with blending, according to at least some embodiments. As indicated at 300, a flat including a plurality of microimages of separate portions of an image of a scene is obtained. Each of the plurality of microimages is in a separate region of the flat. The flat is a two-dimensional (2D) representation of a four-dimensional (4D) light-field that captures both spatial and angular information of the scene, captured according to focused plenoptic camera technology. As indicated at 302, the method renders an output image of the scene from the plurality of separate microimages. To render the output image, each point in the output image is rendered by blending values from multiple microimages.

FIG. 18B is a flowchart of a method for rendering a given point in an output image, according to at least some embodiments of the rendering with blending technique. As indicated at 310, a target microimage in the flat is determined for this point. As indicated at 312, a position in the target microimage from which a value is to be sampled is calculated. As indicated at 314, for each microimage in a neighborhood including the target image (e.g., a 3×3 neighborhood), a value from the calculated position in the respective microimage is calculated, and the value is added to a value accumulator. In at least some embodiments, the value may be weighted according to the position of the respective microimage in the neighborhood before adding the value to the accumulator. In at least some embodiments, the weight used may also be added to a separate weight accumulator. As indicated at 316, the value in the value accumulator may be normalized, and the normalized value may be assigned to the point in the output image. In at least some embodiment, normalizing may be performed by dividing the accumulated value by the accumulated weight value. Other methods for normalizing, for example averaging, may be used in some embodiments. The section above titled Example rendering with blending algorithm gives an example implementation of the method of FIG. 18B.

In at least some embodiments, the methods of FIGS. 18A and 18B perform the rendering with blending technique according to parallel processing technology that renders multiple points of the output image in parallel. In at least some embodiments, the parallel processing technology is graphical processing unit (GPU) technology.

Combining Depth-Based Rendering and Rendering with Blending

While both the depth-based rendering technique and the rendering with blending technique described herein may be implemented separately, embodiments of a combined technique that uses both depth-based rendering and rendering with blending are described. In the combined technique, depth may be estimated as described for the depth-based rendering technique. The rendering may then be performed similar to that described for the rendering with blending technique where values are sampled (with weighting) from several neighboring microimages. However, the value of M in the rendering with blending technique would be calculated as in the depth-based rendering technique (given by M2 in the example shader code) prior to sampling the values in the loop of the rendering with blending technique. Thus, for each point in the output being calculated by a shader the algorithm, the value of M would be calculated as in the depth-based rendering technique, and multiple microimages would be sampled as in the rendering with blending technique at the calculated value of M. For different points being rendered, M would be different, but for each point the value would be a blended value.

Figure 19:
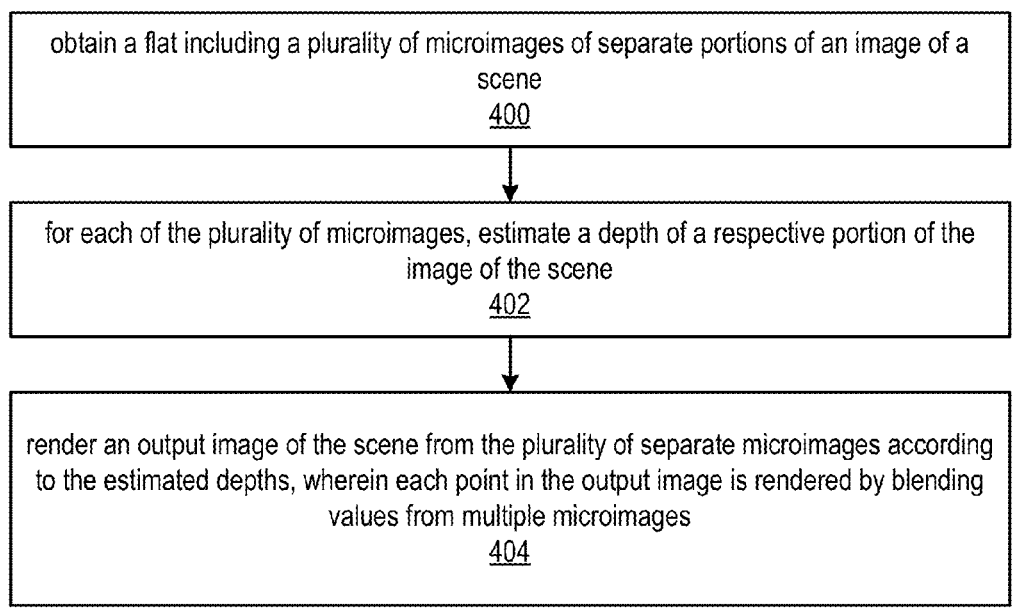
FIG. 19 is a flowchart of a method for combined depth based rendering and rendering with blending, according to at least some embodiments.

FIG. 19 is a high-level flowchart of a method for combined depth based rendering and rendering with blending, according to at least some embodiments. As indicated at 400, a flat including a plurality of microimages of separate portions of an image of a scene is obtained. As indicated at 402, for each of the plurality of microimages, a depth of a respective portion of the image of the scene is estimated. An example method for estimating depth is given above in the section titled Depth estimation. As indicated at 404, an output image of the scene is rendered from the plurality of separate microimages according to the estimated depths. Each point in the output image is rendered by blending values from multiple microimages in a neighborhood including the target microimage; the estimated depth for the target microimage applies to all of the microimages because the sampling position in the microimages is calculated according to the estimated depth for the target microimage. The section above titled Example depth-based rendering algorithm gives an example implementation of a method that applies the estimated depth to determine the sampling position. The section above titled Example rendering with blending algorithm gives an example implementation of a method that blends values from multiple microimages in a neighborhood.

Example User Interface

Figure 20:
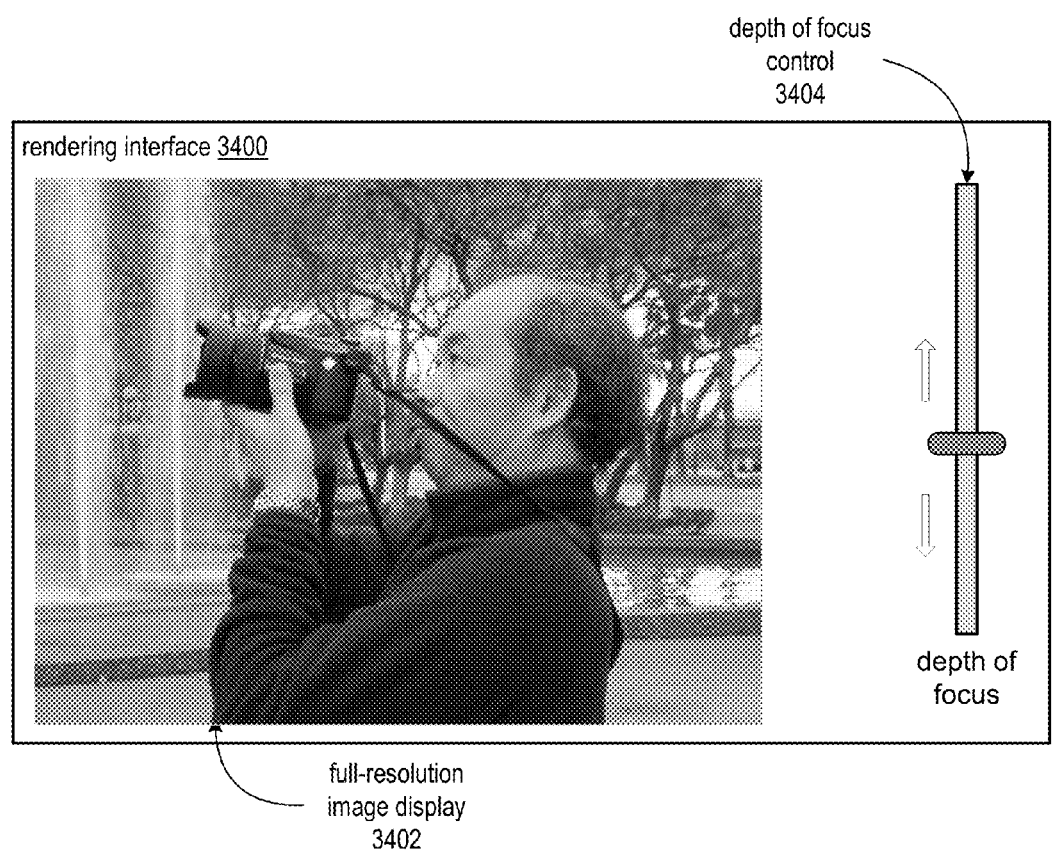
FIG. 20 shows an example user interface, according to some embodiments, for processing a flat captured with a focused plenoptic camera to render a full-resolution output image.

FIG. 20 shows an example user interface, according to some embodiments, for processing a flat captured with a focused plenoptic camera according to one of the full-resolution rendering techniques described herein to render an output image. At least some embodiments may provide a user interface 3400 and one or more user interface elements (e.g., full-resolution image 3402 and depth of focus control 3404) via which a user can interactively apply a full-resolution rendering algorithm to an input image. In at least some embodiments, the user interface may provide a depth of focus control 3404, such as a slider bar, via which the user can change the depth of focus. In at least some embodiments, the user interface may provide one or more other user interface elements for adjusting one or more other rendering parameters. In at least some embodiments, the rendering algorithm may be implemented, at least in part, to execute on parallel processing technology, for example as a graphics processing unit (GPU) application executable on a GPU. This technique may provide immediate feedback; that is, the user may adjust the user interface element and interactively see the new rendering results on a displayed full-resolution image 3402. Thus, the user may tweak the user interface element 3404 to quickly determine a preferred depth of focus or other parameter to generate a full-resolution output image 3402 from an input focused plenoptic camera image.

Example Implementations of Rendering Methods

Figure 21:
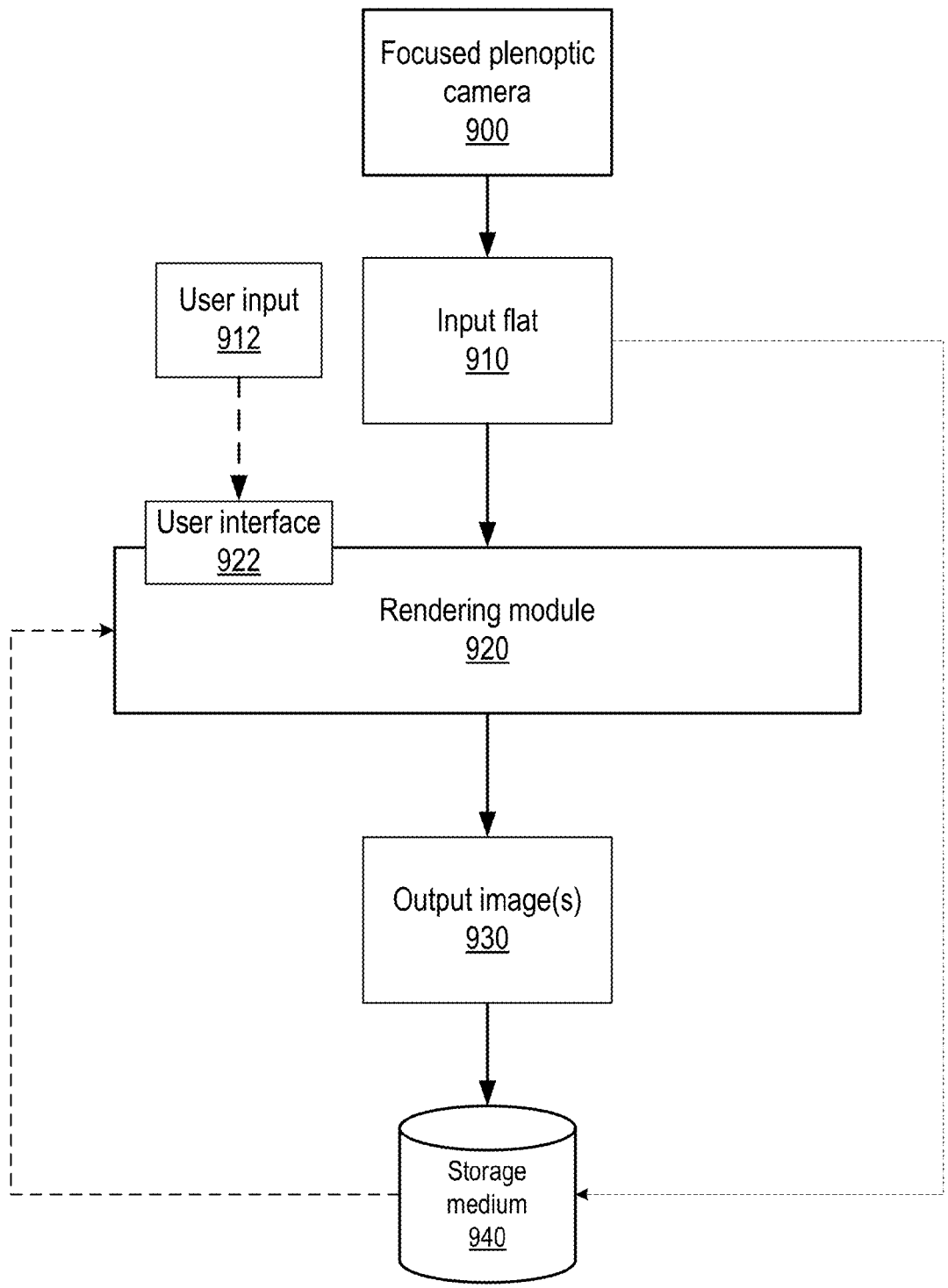
FIG. 21 illustrates a rendering module rendering a full-resolution image from a flat captured, for example, by a focused plenoptic camera, according to some embodiments.
Figure 22:
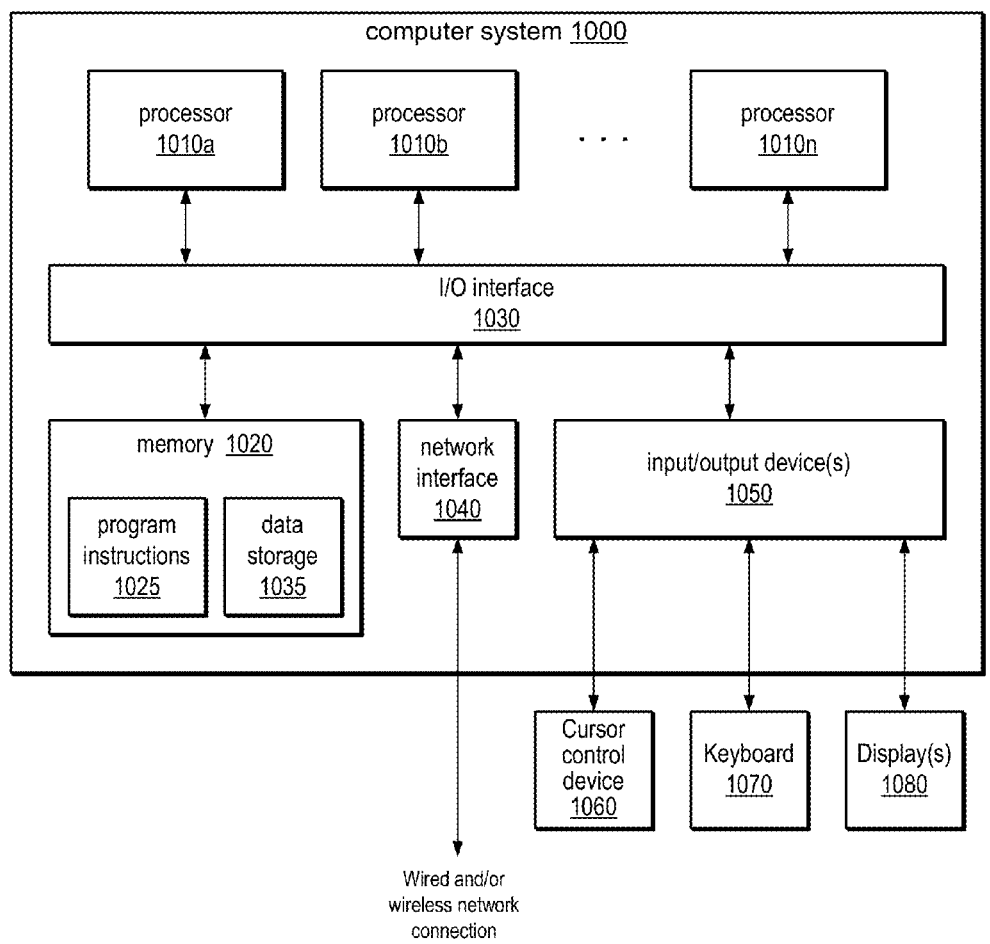
FIG. 22 illustrates an example computer system that may be used in embodiments.

Embodiments of the full-resolution rendering techniques as described herein may be performed by a rendering module implemented by program instructions stored in a computer-readable storage medium and executable by one or more processors (e.g., one or more CPUs or GPUs) of a computer system or other device. FIG. 21 illustrates a full-resolution rendering module rendering images from a flat captured, for example, by various embodiments of a focused plenoptic camera. Rendering module 920 may, for example, implement a basic full resolution rendering technique, a depth-based rendering technique, a rendering with blending technique, and/or a combined depth-based rendering and rendering with blending technique for rendering full-resolution images from flats captured using focused plenoptic cameras, as described herein. FIG. 22 illustrates an example computer system on which embodiments of rendering module 920 may be implemented. FIG. 20 illustrates an example user interface for a rendering module 920 (note that other user interfaces may also be provided). In some embodiments of a focused plenoptic camera, rendering module 920 may be implemented in the camera, e.g. in captured data processing module. Referring to FIG. 21, rendering module 920 receives an input flat 910 captured by focused plenoptic camera technology. Example portions of flats as may be captured by various embodiments of a focused plenoptic camera are illustrated in FIG. 8 and FIG. 16A. Rendering module 920 then processes the input image 910 according to an appropriate full-resolution rendering technique as described herein, for example the full resolution rendering technique, the depth-based rendering technique, the rendering with blending technique, or the combined depth-based rendering and rendering with blending technique. Rendering module 920 generates as output one or more images 930. Output image 930 may, for example, be stored to a storage medium 940, such as system memory, a disk drive, DVD, CD, etc. The dashed line from input image 910 to storage medium 940 indicates that the original (input) flat 910 may also be stored. The dashed line from storage medium 940 to rendering module 920 indicates that stored images may be retrieved and further processed by rendering module 920.

In some embodiments, rendering module 920 may provide a user interface 922 via which a user may interact with the module 920, for example to specify or otherwise manage input flats 910 and output images 930 as described herein. The user interface 922 may also provide one or more user interface elements whereby the user may select parameters of the full-resolution rendering method, such as the depth of focus to be used to render an image from a given flat. An example user interface is shown in FIG. 20.

Example System

Embodiments of a full resolution rendering module and/or one or more of the various full resolution rendering methods as described herein may be executed on one or more computer systems, which may interact with various other devices. One such computer system is illustrated by FIG. 22. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. In some embodiments, computer system 1000 may be a digital camera.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the various rendering methods disclosed herein may be implemented at least in part by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a rendering module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 22, memory 1020 may include program instructions 1025, configured to implement embodiments of a rendering module as described herein, and data storage 1035, comprising various data accessible by program instructions 1025. In one embodiment, program instructions 1025 may include software elements of embodiments of a rendering module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a rendering module as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
    obtaining a flat comprising a plurality of microimages of separate portions of an image of a scene, wherein each of the plurality of microimages is in a separate region of the flat that is a two-dimensional (2D) representation of a four-dimensional (4D) light-field that captures both spatial and angular information of the scene;
    rendering an output image of the scene from the plurality of microimages, said rendering for each point of the output image comprising:
    determining a target microimage in the flat for a point;
    calculating a position in the target microimage from which a value is to be sampled;
    for each microimage in a neighborhood including the target microimage, reading the value from the calculated position in the respective microimage and adding the value to a value accumulator, said adding the value comprising weighting the value read from the respective microimage according to a position of the respective microimage in the neighborhood prior to said adding the value to the value accumulator; and
    normalizing the value in the value accumulator and assigning the normalized value to the point in the output image.

2. The method as recited in claim 1, wherein said rendering the output image of the scene from the plurality of microimages comprises performing said rendering according to a parallel processing technique that renders multiple points of the output image in parallel.

3. The method as recited in claim 2, wherein the parallel processing technique is implemented according to graphical processing unit (GPU) technology.

4. The method as recited in claim 1, wherein said normalizing the value in the value accumulator comprises normalizing the value in the value accumulator according to a sum of the weights of the microimages in the neighborhood.

5. The method as recited in claim 1, wherein said calculating the position in the target microimage from which the value is to be sampled comprises calculating the position within an M×M region within the target microimage.

6. The method as recited in claim 1, wherein for each said microimage in the neighborhood including the target microimage, the values from the calculated positions in the respective microimages are averaged together across the plurality of microimages.

7. The method as recited in claim 1, wherein a focused plenoptic camera implements said obtaining a plenoptic image as the flat comprising the plurality of the microimages through an array of microlenses.

8. A non-transitory computer-readable storage memory storing program instructions that are executable and, responsive to execution of the program instructions, a computer device implements operations comprising to:
    obtaining a flat comprising a plurality of microimages of separate portions of an image of a scene, wherein each of the plurality of microimages is in a separate region of the flat that is a two-dimensional (2D) representation of a four-dimensional (4D) light-field that captures both spatial and angular information of the scene;
    rendering an output image of the scene from the plurality of microimages, said rendering for each point of the output image comprising:
    determining a target microimage in the flat for a point;
    calculating a position in the target microimage from which a value is to be sampled;
    for each microimage in a neighborhood including the target microimage, reading the value from the calculated position in the respective microimage and adding the value to a value accumulator, said adding the value comprising weighting the value read from the respective microimage according to a position of the respective microimage in the neighborhood prior to said adding the value to the value accumulator; and
    normalizing the value in the value accumulator and assigning the normalized value to the point in the output image.

9. The non-transitory computer-readable storage memory as recited in claim 8, wherein the computer device implements said rendering the output image of the scene from the plurality of microimages according to a parallel processing technique that renders multiple points of the output image in parallel.

10. The non-transitory computer-readable storage memory as recited in claim 9, wherein the parallel processing technique is implemented according to graphical processing unit (GPU) technology.

11. The non-transitory computer-readable storage memory as recited in claim 8, wherein the computer device implements said normalizing the value in the value accumulator according to a sum of the weights of the microimages in the neighborhood.

12. The non-transitory computer-readable storage memory as recited in claim 8, wherein the computer device implements said calculating the position in the target microimage from which the value is to be sampled within an M×M region within the target microimage.

13. The computer-readable storage memory as recited in claim 8, wherein for each said microimage in the neighborhood including the target microimage, the computer device implements averaging the values from the calculated positions in the respective microimages together across the plurality of microimages.

14. The computer-readable storage memory as recited in claim 8, wherein the computer device is a focused plenoptic camera that implements said obtaining a plenoptic image as the flat comprising the plurality of the microimages through an array of microlenses.

15. A system, comprising
at least one processor; and
a memory comprising program instructions that are executable by the at least one processor to:
obtain a flat comprising a plurality of microimages of separate portions of an image of a scene, wherein each of the plurality of microimages is in a separate region of the flat that is a two-dimensional (2D) representation of a four-dimensional (4D) light-field that captures both spatial and angular information of the scene;
render an output image of the scene from the plurality of microimages, and for each point of the output image:
determine a target microimage in the flat for a point;
calculate a position in the target microimage from which a value is to be sampled;
for each microimage in a neighborhood including the target microimage, read the value from the calculated position in the respective microimage and add the value to a value accumulator, the value being added comprising the value read from the respective microimage weighted according to a position of the respective microimage in the neighborhood prior to the value being added to the value accumulator; and
normalize the value in the value accumulator and assign the normalized value to the point in the output image.

16. The system as recited in claim 15, wherein the at least one processor includes at least one graphical processing unit (GPU), and wherein the program instructions are executable by the at least one GPU to render the output image of the scene from the plurality of microimages according to a parallel processing technique that renders multiple points of the output image in parallel.

17. The system as recited in claim 15, wherein the program instructions are executable by the at least one processor to normalize the value in the value accumulator according to a sum of the weights of the microimages in the neighborhood.

18. The system as recited in claim 15, wherein the program instructions are executable by the at least one processor to calculate the position in the target microimage from which the value is to be sampled within an M×M region within the target microimage.

19. The system as recited in claim 15, wherein for each said microimage in the neighborhood including the target microimage, the program instructions are executable by the at least one processor to average the values from the calculated positions in the respective microimages together across the plurality of microimages.

20. The system as recited in claim 15, wherein a focused plenoptic camera comprises the at least one processor and the memory, and wherein the program instructions are executable to said obtain a plenoptic image as the flat comprising the plurality of the microimages through an array of microlenses.

* * * * *